(12) United States Patent
Wang

(10) Patent No.: US 11,342,620 B2
(45) Date of Patent: May 24, 2022

(54) BATTERY MODULE SCALABLE IN THREE DIMENSIONS

(71) Applicant: CHONGQING JINKANG POWERTRAIN NEW ENERGY CO., LTD., Chongqing (CN)

(72) Inventor: Jiaxian Wang, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 227 days.

(21) Appl. No.: 16/292,153

(22) Filed: Mar. 4, 2019

(65) Prior Publication Data

US 2020/0287177 A1 Sep. 10, 2020

(51) Int. Cl.
| | |
|---|---|
| *H01M 10/613* | (2014.01) |
| *H01M 10/625* | (2014.01) |
| *H01M 10/643* | (2014.01) |
| *H01M 10/42* | (2006.01) |
| *B60L 50/64* | (2019.01) |
| *H01M 50/20* | (2021.01) |
| *H01M 50/502* | (2021.01) |

(52) U.S. Cl.
CPC ............ *H01M 50/20* (2021.01); *B60L 50/64* (2019.02); *H01M 10/425* (2013.01); *H01M 10/613* (2015.04); *H01M 10/625* (2015.04); *H01M 10/643* (2015.04); *H01M 50/502* (2021.01); *B60Y 2200/91* (2013.01); *B60Y 2306/05* (2013.01); *B60Y 2400/112* (2013.01); *H01M 2010/4271* (2013.01); *H01M 2220/20* (2013.01)

(58) Field of Classification Search
CPC .......................... H01M 50/20; H01M 50/502
See application file for complete search history.

(56) References Cited

U.S. PATENT DOCUMENTS

| | | | |
|---|---|---|---|
| 10,243,183 B1* | 3/2019 | Harris, III ........... | H01M 50/502 |
| 2010/0247994 A1* | 9/2010 | Park .................. | H01M 10/4207 |
| | | | 429/96 |
| 2012/0231316 A1* | 9/2012 | Sohn .................. | H01M 10/613 |
| | | | 429/120 |
| 2013/0011712 A1* | 1/2013 | Katagiri ............ | H01M 10/6567 |
| | | | 429/120 |
| 2014/0087229 A1* | 3/2014 | Watanabe ............. | H01M 50/20 |
| | | | 429/99 |

(Continued)

*Primary Examiner* — Imran Akram
(74) *Attorney, Agent, or Firm* — Cooper Legal Group, LLC

(57) ABSTRACT

Provided is a scalable battery module. In once example embodiment, the module includes a plurality of submodules. Each plurality of submodules is configured to hold one or more cell batteries. The module further includes one or more of a first connector, a second connector, or a third connector. The first connector may secure an alignment of two or more adjacent submodules of the plurality of submodules along a first dimensional axis by using at least one of two slots and two projections of the first connector. The second connector secures the alignment of two adjacent submodules of the plurality of submodules along a second dimensional axis by using at least two further slots of the second connector. The third connector secures the alignment of two adjacent submodules of the plurality of submodules along a third dimensional axis by using at least two further projections of the third connector.

20 Claims, 32 Drawing Sheets

(56) References Cited

U.S. PATENT DOCUMENTS

| | | | |
|---|---|---|---|
| 2014/0141309 A1* | 5/2014 | Suzuki | H01M 50/20 |
| | | | 429/99 |
| 2014/0234683 A1* | 8/2014 | Sweney | H01M 10/6554 |
| | | | 429/99 |
| 2015/0064523 A1* | 3/2015 | Lim | H01M 50/20 |
| | | | 429/82 |
| 2016/0043366 A1* | 2/2016 | Suzuki | H01M 50/136 |
| | | | 429/156 |
| 2017/0200926 A1* | 7/2017 | Motokawa | H01M 50/502 |
| 2018/0205110 A1* | 7/2018 | Yuk | H01M 6/005 |
| 2019/0074557 A1* | 3/2019 | Shin | H01M 10/613 |
| 2019/0097202 A1* | 3/2019 | Morone | H01M 50/503 |
| 2019/0144207 A1* | 5/2019 | Tsuchiya | B65G 11/203 |
| | | | 414/754 |
| 2020/0058973 A1* | 2/2020 | Golubkov | H01M 10/6563 |

* cited by examiner

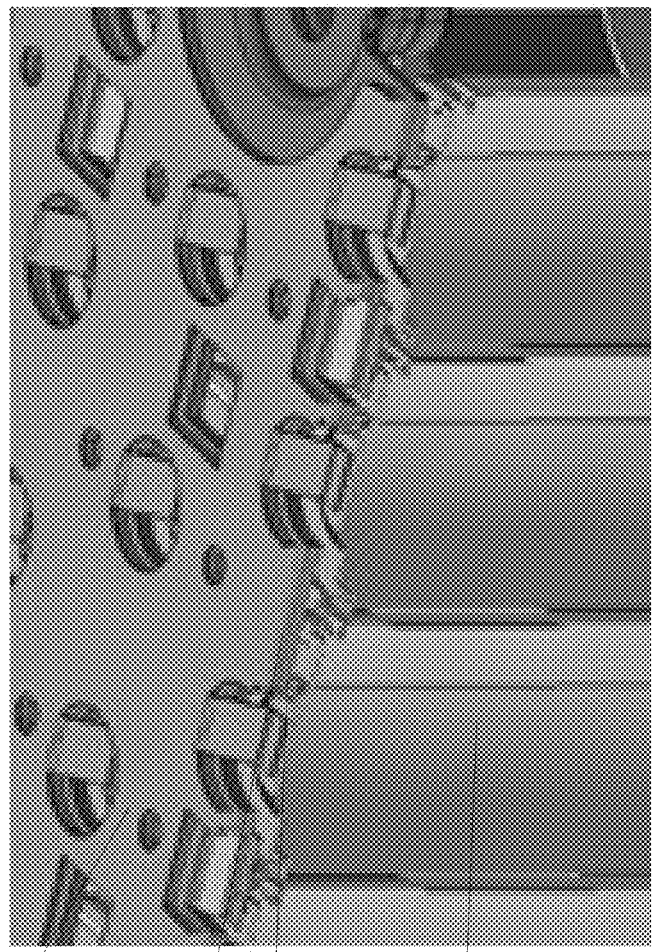
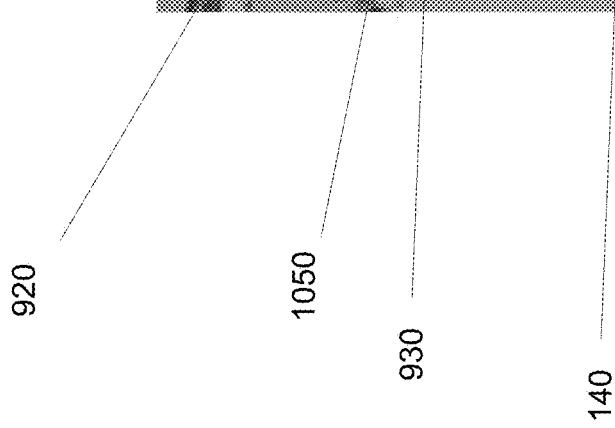
FIG. 11

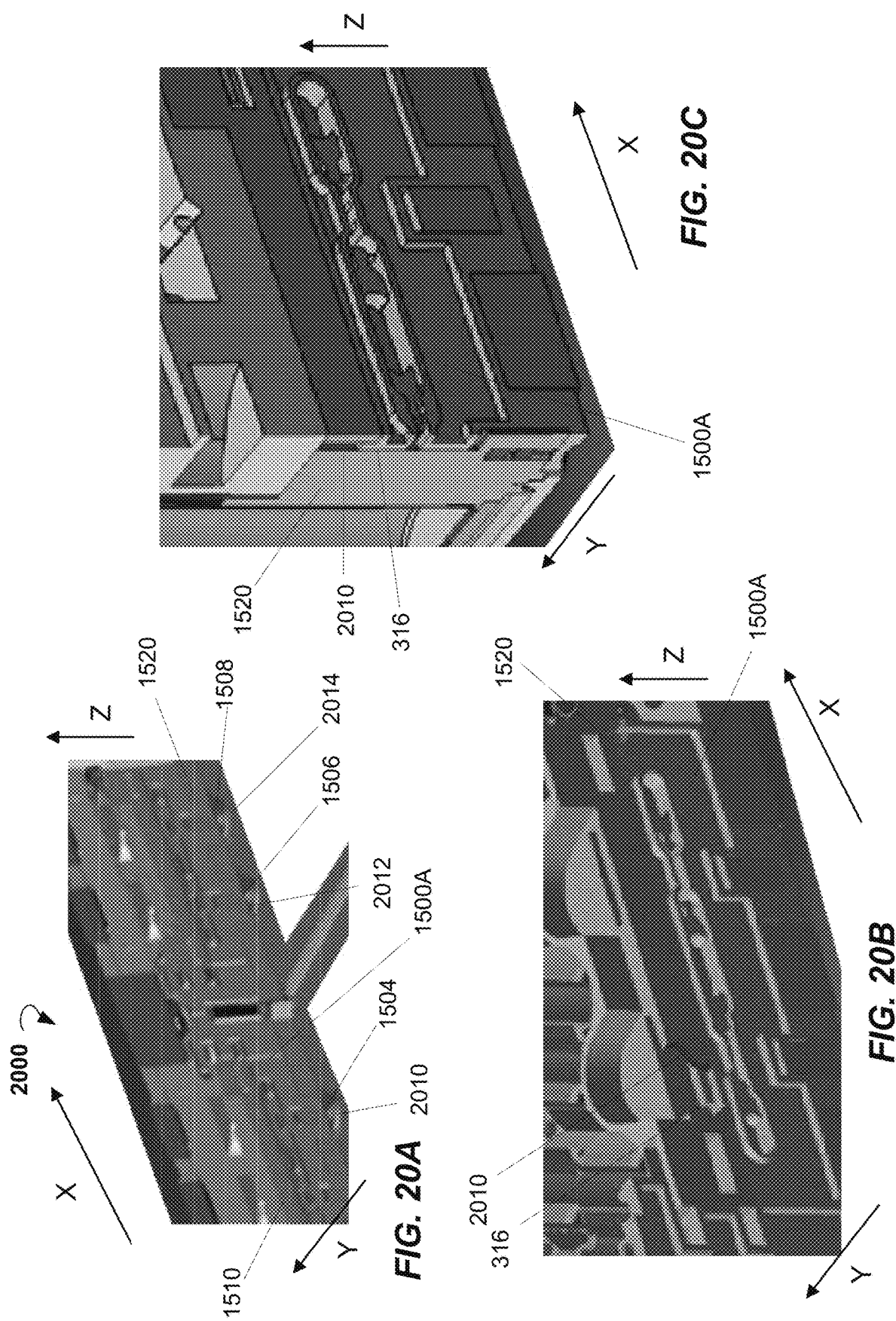

BATTERY MODULE SCALABLE IN THREE DIMENSIONS

BACKGROUND

Batteries are widely used to power different mechanisms, such as for example electrically-driven vehicles. Battery modules can be custom designed to hold the batteries of an electrically-driven vehicle. The battery module contains fixed size batteries in order to fit inside a custom space within the electric vehicle. As such, a battery module designed for one vehicle will not fit inside another vehicle. What is needed is an improved battery module.

SUMMARY

The present technology, roughly described, includes a scalable battery module that can be expanded three dimensionally to provide a denser battery system to different battery sized spaces for different products. Some embodiments of the present disclosure provide a battery module including submodules connected to each other by connectors. The battery module can be scalable in one of the three dimensional axes by connecting one or two submodules to the submodules already inside the battery module.

According to one example embodiment of the present disclosure, a scalable battery module is provided. The scalable battery module may include a plurality of submodules. Each of the plurality of submodules can be configured to hold one or more cell batteries. The scalable battery module may include a first connector, a second connector, and a third connector. The first connector can be configured to align at least two adjacent submodules of the plurality of submodules along a first dimensional axis. The two adjacent modules can be secured by using at least one of two slots and two projections of the first connector. The second connector can be configured to align at least two adjacent submodules of the plurality of submodules along a second dimensional axis. The two adjacent modules can be secured using at least two further slots of the second connector. The third connector can be configured to align two adjacent submodules of the plurality of submodules along a third dimensional axis. The two adjacent modules can be secured by using two further projections of the third connector.

Other example embodiments of the disclosure and aspects will become apparent from the following description taken in conjunction with the following drawings.

BRIEF DESCRIPTION OF DRAWINGS

FIG. 11 is a close up view of a negative positive current collector and negative current collector in the assembly and contacting cell batteries.

FIG. 20A is close up view of a scalable battery module including an X-connector and submodules.

FIG. 20B is a section cut of a submodule.

FIG. 20C is another section cut of a submodule.

DETAILED DESCRIPTION

Figure 1:
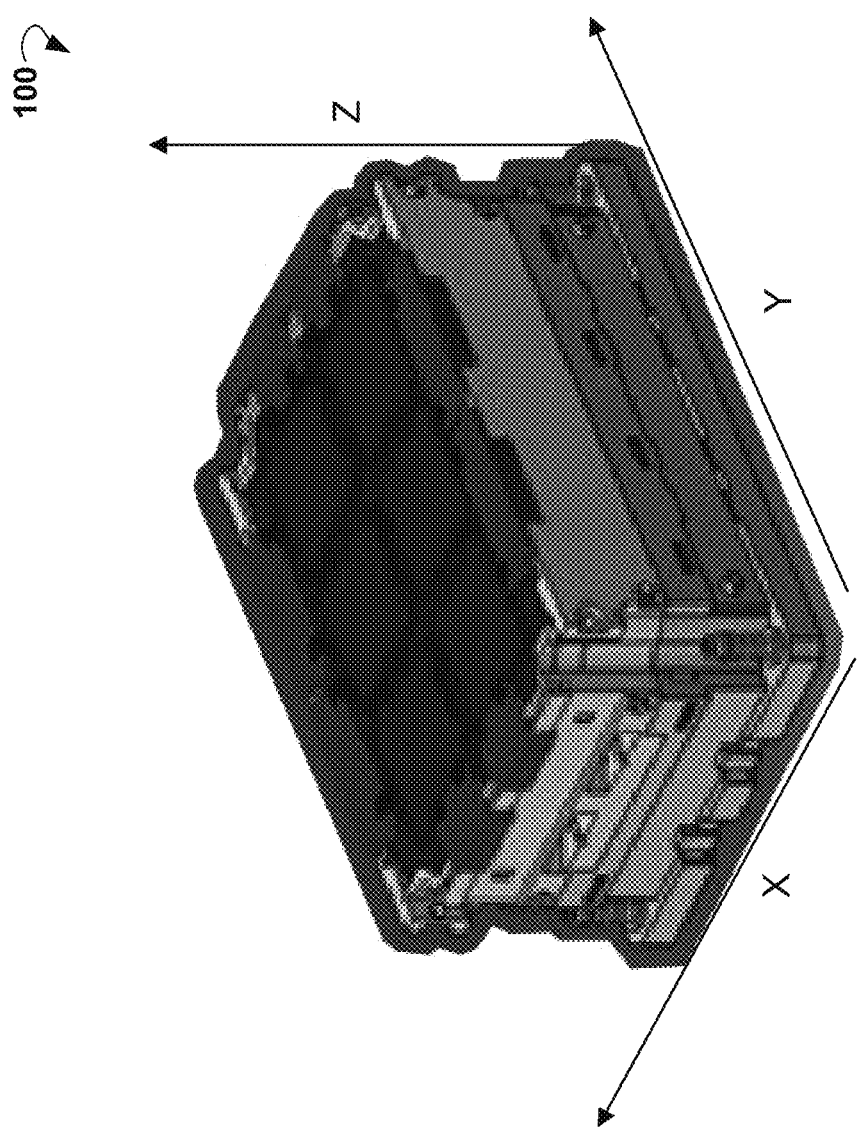
FIG. 1 is a top angle view of an example submodule of the assembly, according to an example embodiment.

The present technology, roughly described, is a scalable battery module. The scalable battery module may include submodules for holding cell batteries. The submodules can be aligned to each other and secured by connectors. Furthermore, the submodules can be electrically connected by busbars.

Each submodule may include one or more built-in scalability features allowing the scalable battery module to be scaled in any of three-dimensional axes, referred herein as X-axis, Y-axis, and Z-axis. The scalable battery module can be scaled by adding one or more submodules to submodules already packed in the scalable battery module along any one of the three dimensional axes.

The submodules can be combined to obtain a scalable battery module of a desired size and shape. The shape and size of the scalable battery module can be based on a configuration of a pack for the battery modules. The configuration of a combination of the submodules can be selected so that the resulting scalable battery module optimally fits inside the battery pack. By providing a scalable battery module that can be scaled in any of an x direction, y direction, and z direction, the scalable battery module can be scaled in the three directions to fill different shapes allocated for a battery within a device or product. As such, the present battery module system can be used to provide battery cells for different products having different areas and shapes available for containing a battery, eliminating the need to design separate battery cell parts and structures for different products.

Each submodule may also include a build-in cooling chamber assembly. The cooling chamber assembly may be in contact with the coldest spot of the cell batteries in the submodule. The cooling chamber assembly may provide efficient cooling of the cell batteries and help to facilitate fast charge and fast discharge of the cell batteries.

The scalable battery module may also be implemented without a cold plate and connection screws. Therefore, the scalable battery module may have a higher power density than the currently used battery modules, as the space required by the cold plate can be filled with battery cells. The scalable module may include plug-in features for thermal sensor and a battery management unit (BMU) assembly and by so provide for a faster manufacturing assembly. The scalable battery module includes an integrated module of current collectors to allow for quick manufacturing assembly and robust performance.

According to one example embodiment of the present disclosure, a scalable battery module may include a plurality of submodules. Each submodule can be configured to hold one or more cell batteries. The scalable battery module may further include one or more of a first (X-) connector, a second (Y-) connector and a third (Z-) connector. The X-connector can secure an alignment of two and more adjacent submodules of the plurality of submodules along a first dimensional axis (X-axis). The two and more modules can be secured by using one of two slots and two projections disposed in the X-connector. The Y-connector can secure the alignment of two adjacent submodules along a second dimensional axis (Y-axis). The two adjacent modules can be secured using at least two further slots of the second connector. The third (Z-) connector can secure the alignment of two adjacent submodules of the plurality of submodules along a third dimensional axis (Z-axis). The two adjacent modules can be secured by using at least two further projections from the third connector. Though examples are described with two adjacent modules, any number of modules can be connected together in x-direction, y-direction, or z-direction.

The battery module described herein which is scalable in three directions has several advantages over the prior art. Existing battery modules may use a cold plate to cool down cell batteries. Thus, the size of the existing modules can be dictated by the size of the cold plate. As a result, the existing battery modules can only accommodate a battery pack of a specific size. The use of the existing battery modules with a battery pack of a different size can be impossible due to the size and shape differences. Furthermore, the existing battery modules can be heavy because of the use of metal cold plates and large number of metal screws to affix a battery module to a metal cold plate.

Further, the existing modules of the prior art are typically connected by glue and by three different current collectors. This results in complex connections and undesired expenses because different types of busbars can be needed to manufacture packs of battery modules. Moreover, cooling of the existing modules can be inefficient because the cold plate may contact the bottom of battery, which is the least hot place of the battery. The existing modules are often mounted on the bottom of a battery pack without securing the top of the battery modules. As a result, when a vehicle is in motion, the top of the modules can shake and damage ribbon bonding connections between the modules. The modules of the present technology described herein overcome these deficiencies of the prior art modules.

In some instances, each sub-module described herein may be manufactured as a single-piece element. Hence, no additional parts, tabs, portions, or other pieces need be attached to the particular sub-module in order to allow the sub-module to couple to another sub-module. By implementing each sub-module as a single-piece design to which no parts or portions are added, the manufacturing costs of each sub-module are minimized.

In some instances, sub-modules are coupled together using connectors that are generally linear in shape. More specifically, the connectors have a main portion that extends along a single direction. The main portion of each connector described herein can have tabs, apertures, and other elements that are coupled to, incorporated within, or extend from the particular connector, while the main portion of a connector extends along a single plane.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 is a top angle view of an example submodule 100 in the assembly, according to an example embodiment. The submodule 100 represents a three dimensional assembly. The submodule 100 can be aligned with one, two or additional submodules along X-axis. The additional submodules can be similar to the submodule 100. The submodule 100 can also be aligned with one or more additional submodules along Y-axis. The submodule 100 can also be aligned with one or more additional submodules along Z-axis. The group of the submodules can be further extended in any direction of X-axis, Y-axis, or Z-axis by adding one or more yet further submodules to form a scalable battery module of a desired size and shape. Examples of the scalable battery modules formed by the submodules, similar to the submodule 100, are described further in FIGS. 24A-27.

In some instances, the submodules in the scalable battery module may be the same size. In one example embodiment, the submodule 100 may be 210 millimeters (mm) in length (along Y-axis), 145 mm in width (along X-axis), and 80 mm in height (along Z-axis). In some instances, the scalable battery module may include submodules of a different size. The scalable battery module may also include at least two submodules of two different sizes. The submodules can be electrically connected in the scalable battery modules by using, for example, busbars.

Figure 2:
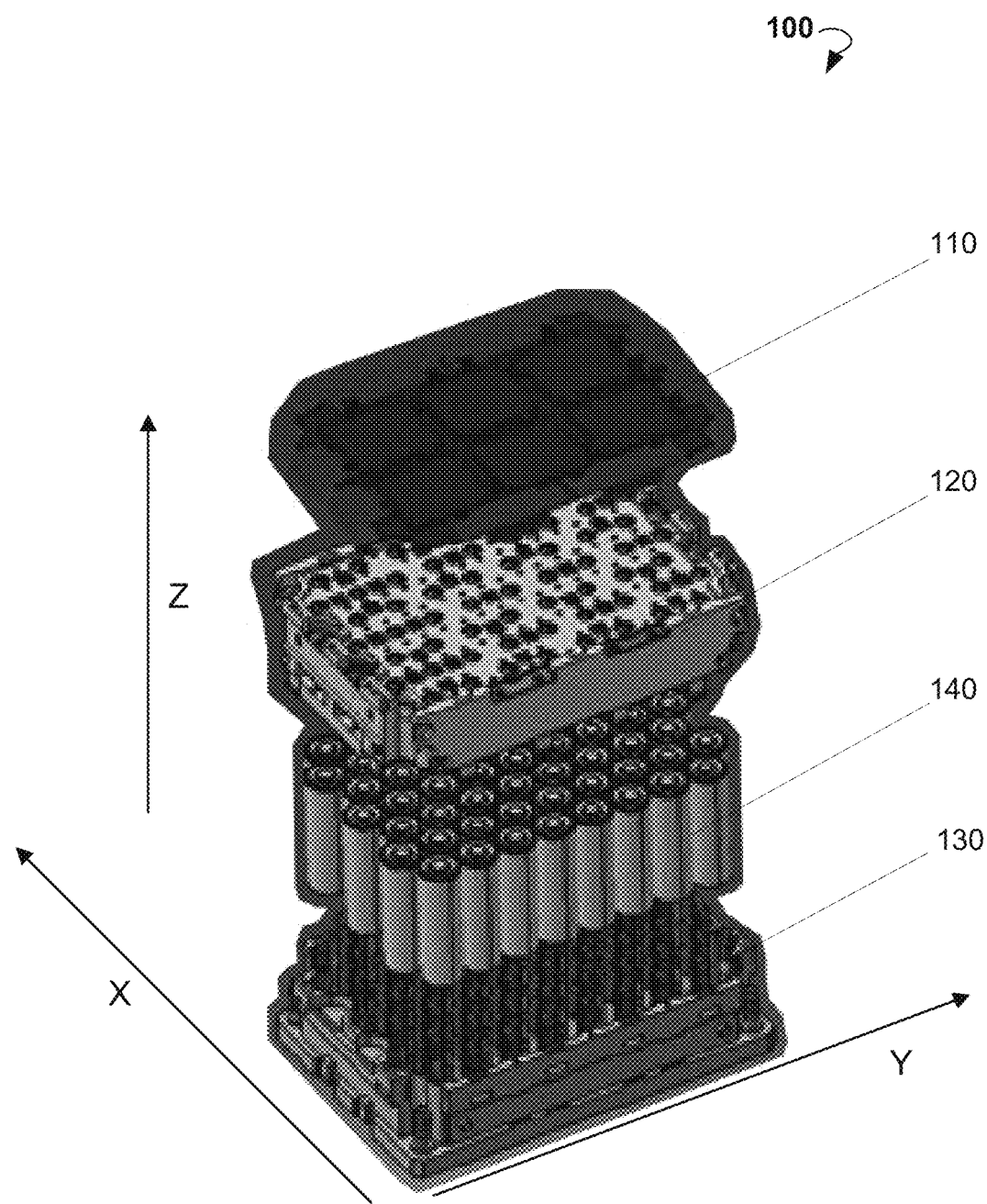
FIG. 2 is an exploded view of a submodule, according to an example embodiment.

FIG. 2 is a top angle exploded view of the submodule 100, according to an example embodiment. The submodule 100 may include a cover assembly 110, an electric connection assembly 120, and cooling chamber assembly 130. The cell batteries 140 can be disposed between the cooling chamber assembly 130 and the electrical connection assembly 120. The electrical assembly 120 can be covered by the cover assembly 110. Each of the assemblies 110, 120, and 130 may include one or more built-in connecting features for connecting to features of X-connector, Y-connector, or Z-connector. The connecting features are described in more detail below in FIGS. 17, 20A-20C, 23B, and 23C. The assemblies 110, 120, and 130 may further include plug-in features for a thermal sensor, a battery management unit (BMU), and busbar covers. The plug-in features are described in more details below in FIGS. 8A-8D.

Figure 3:
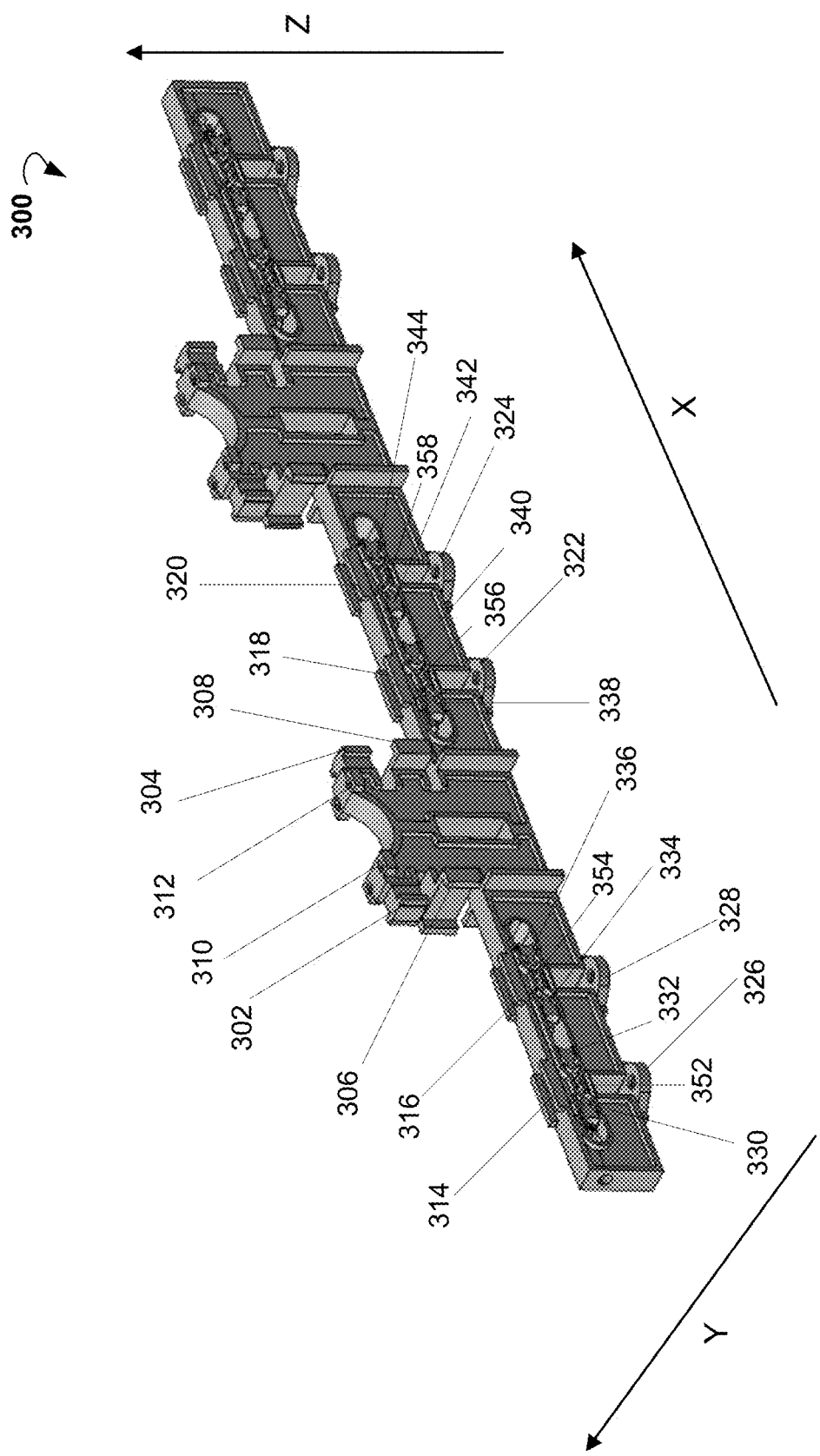
FIG. 3 is a top angle view of a "double side" X-connector, according to an example embodiment.

FIG. 3 is a top angle view of a "double side" X-connector 300, according to an example embodiment. The X-connector 300 is used to connect battery modules along the x-axis. X-connector 300 includes a plate with features for connecting to features of submodules 100. The X-connector 300 is symmetrical with respect to Y-axis. Therefore, the X-connector 300 can be used to secure alignment of at least two submodules 100 from a front side of the X-connector 300 and at least two additional submodules 100 can form a rear side of the X-connector 300. Overall, the X-connector 300 can be used to secure alignment of three submodules 100 from the front side and additional three submodules 100 from the rear side.

The X-connector 300 may include connecting features. On the front side, the X-connector 300 may include projections 302 and 304, projections 306 and 308, and projections 322, 324, 326, and 328, all along Y-axis. The projections 322, 324, 326, and 328 may each include an aperture extending along the Z-axis. The projections 306 and 308 may include hooks along Y-axis. The X-connector 300 may further include tabs 314, 316, 318, and 320 and pockets 310 and 312, all along Z-axis. Features analogical to projections 302 and 304, projections 306 and 308, projections 322, 324, 326, and 328, tabs 314, 316, 318, and 320 and pockets 310 and 312 can be disposed on the rear side of the X-connector 300. The X-connector 300 may further include slots 352, 354, 356, and 358 and locks 330, 332, 334, 336, 338, 340, 342, and 346. The x-connector may include additional connecting features as well, such as for example additional projections, tabs, pockets, hooks, and other features described herein, as shown in FIG. 3. The connecting features can be repeated further along the X-axis depending on number of submodules 100 to be aligned. If only two submodules 100 are to be aligned from the front side and/or the rear side of the X-connector 300, then the X-connector 300 can be cut.

Figure 4A:
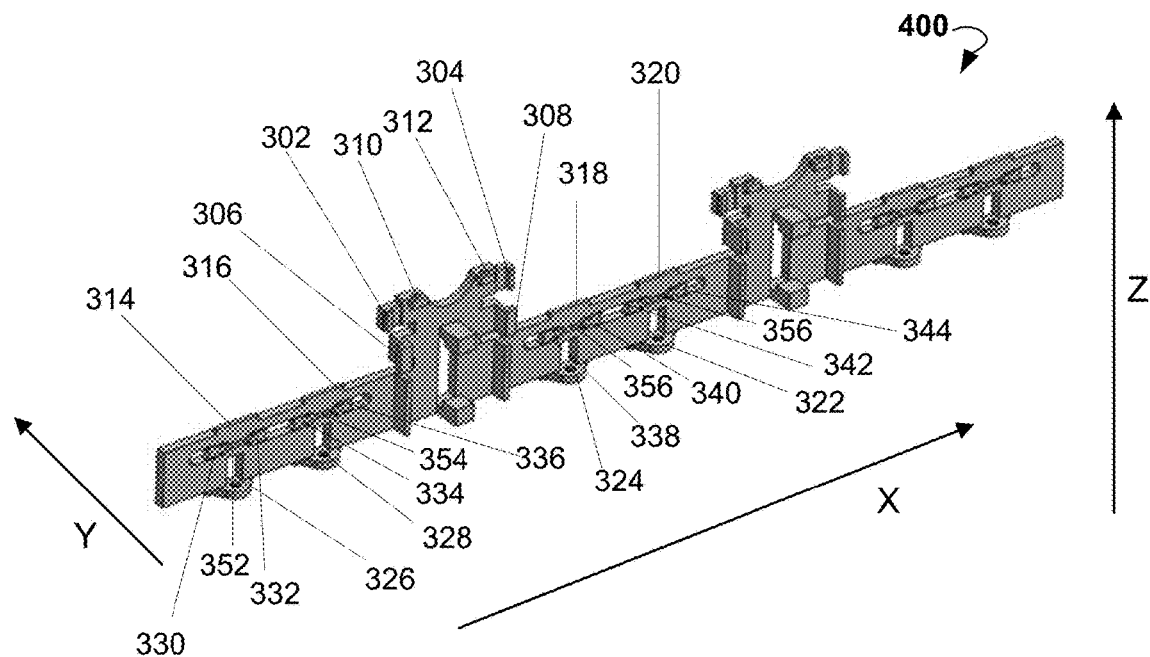
FIG. 4A is a front angle view of a "single side" X-connector, according to an example embodiment.

FIG. 4A is a front angle view of a "single side" X-connector 400, according to an example embodiment. The X-connector 400 includes a plate with features for connecting to features of submodules 100. Unlike the double-side X-connector 300 of FIG. 3, the single-side X-connector 400 of FIG. 4 is not symmetrical with respect to the Y-axis. The difference between the X-connector 400 of FIG. 4 and the X-connector of FIG. 3 is that the X-connector 400 includes features for connecting to submodules to the front side of the X-connector 400. Therefore, the X-connector 400 can be used to secure alignment of at least two submodules 100 from the front side of the X-connector 400 only. Overall, the X-connector 400 can be used to secure alignment of three submodules 100 from the front side.

On the front side, the X-connector 400 may include connecting features similar to connecting features of the X-connector 300. The X-connector 400 may include projections 302 and 304, projections 306 and 308, projections 322, 324, 326, and 328, all along Y-axis. The projections 322, 324, 326, and 328 include apertures along Z-axis. The projections 306 and 308 may include hooks along Y-axis. The X-connector 400 may further include tabs 314, 316, 318, and 320 and pockets 310 and 312, all along Z-axis. The X-connector 300 may further include slots 352, 354, 356, and 358 and locks 330, 332, 334, 336, 338, 340, 342, and 346.

Figure 4B:
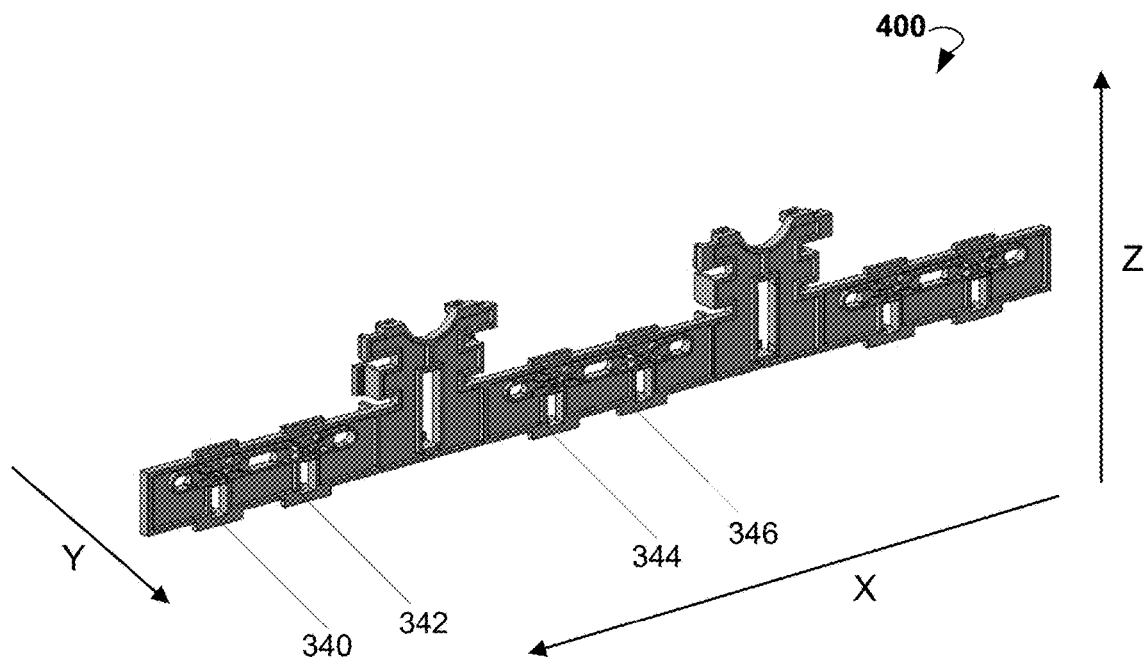
FIG. 4B is a rear angle view of the "single side" X-connector.

FIG. 4B is a rear angle view of the X-connector 400. On the rear side, the X-connector 400 may not include connecting features. As can been seen in FIG. 4B, the X-connector 400 may also include, on the front side, tabs 340, 342, 344, and 346 which are opposite to tabs 314, 316, 318, and 320, respectively. I should be noted, that X-connector 300 shown in FIG. 3 may include tabs 340, 342, 344, and 346 on both the front side and the rear side.

The connecting features can be repeated further along the X-axis depending on a number of submodules 100 to be aligned with X-connection 400. If only two submodules 100 are to be aligned, then the X-connector 400 can be cut.

Figure 5:
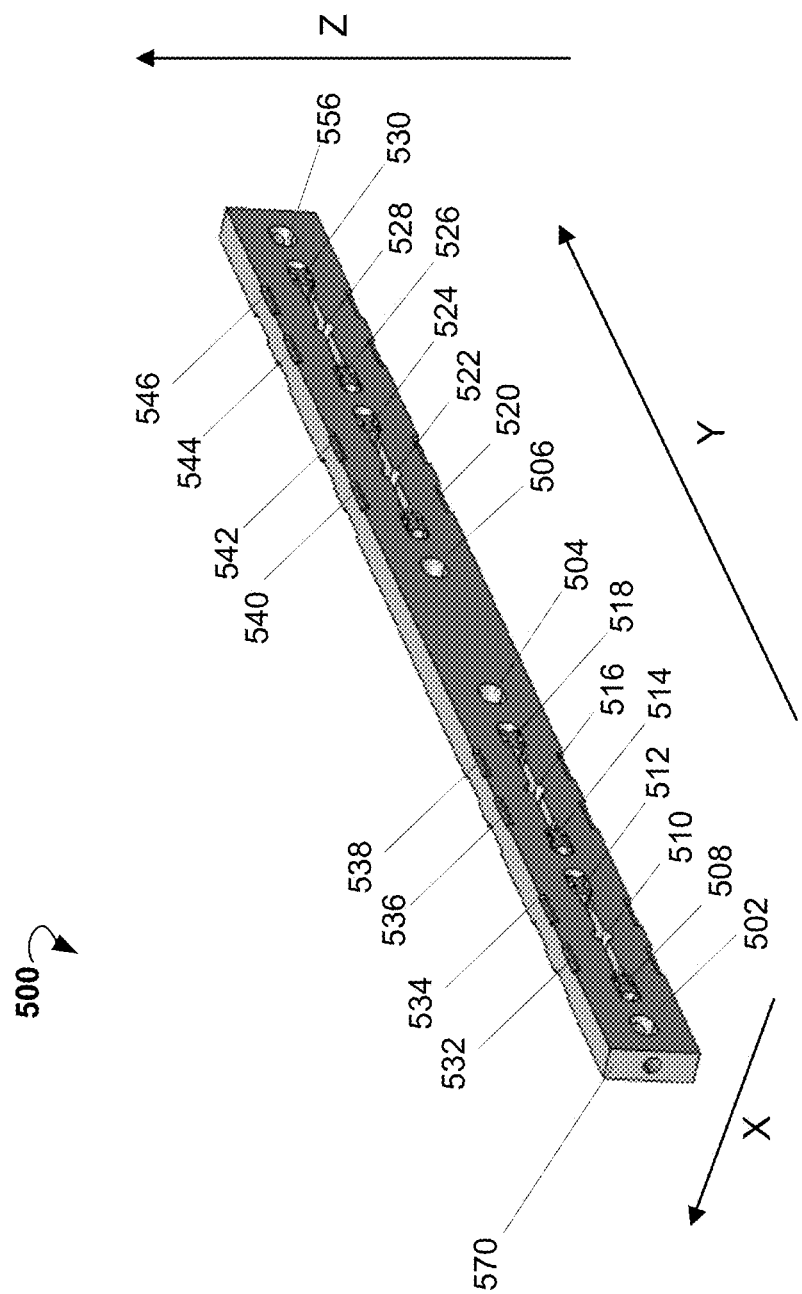
FIG. 5 is a top angle view of a "double side" Y-connector, according to an example embodiment.

FIG. 5 is a top angle view of a "double side" Y-connector 500, according to an example embodiment. The Y-connector 500 is symmetrical with respect to X-axis. Therefore, the Y-connector 500 can be used to secure at least two adjacent submodules 100 along Y-axis from the front side and at least two further adjacent submodules 100 from the rear side. The Y-connector 500 may include a plate with slots 502, 504, 506, and 556. The Y-connector may further include longitudinal slots 510, 516, 522, and 528 and locks 508, 512, 514, 518, 520, 524, 526, and 530, as well as groove cuts 532, 536, 538, 540, 542, 544, and 546 configured to be engaged with connecting features of at least two adjacent submodules 100.

Figure 6A:
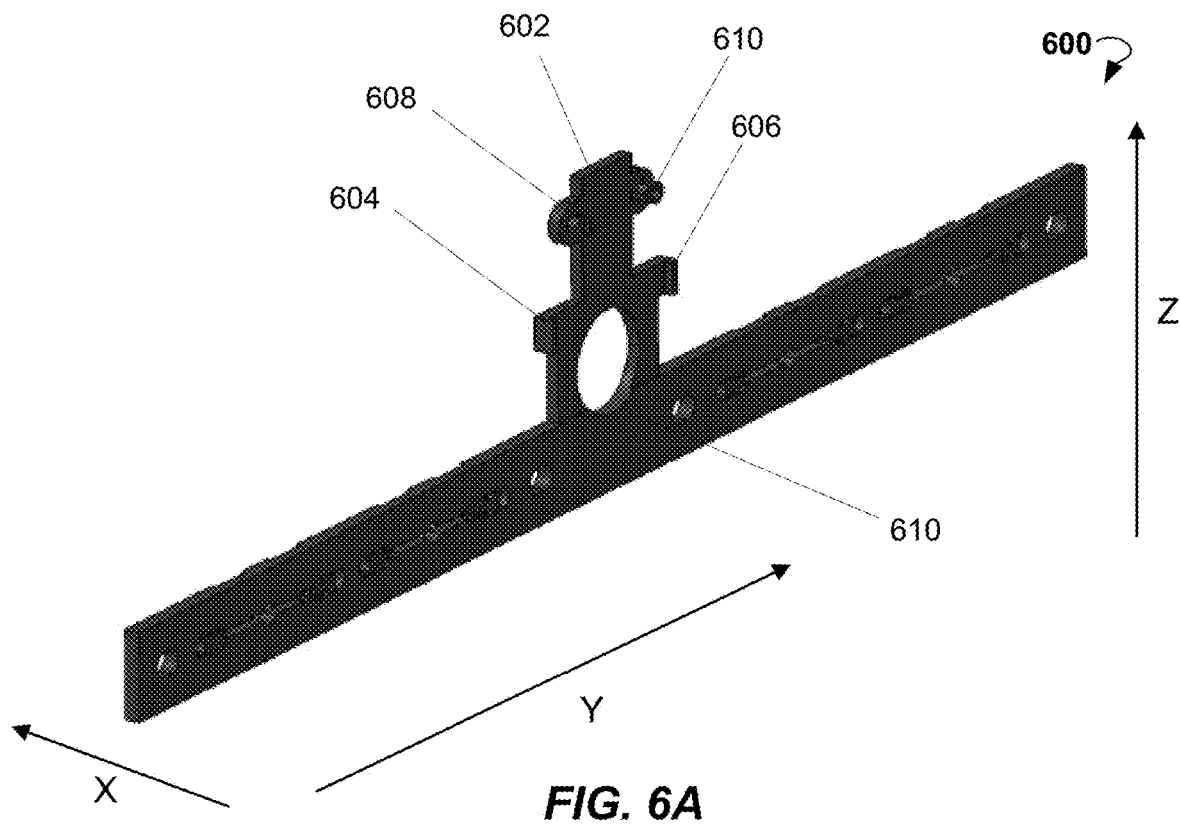
FIG. 6A is a front angle view of a "single side" Y-connector, according to an example embodiment.
Figure 6B:
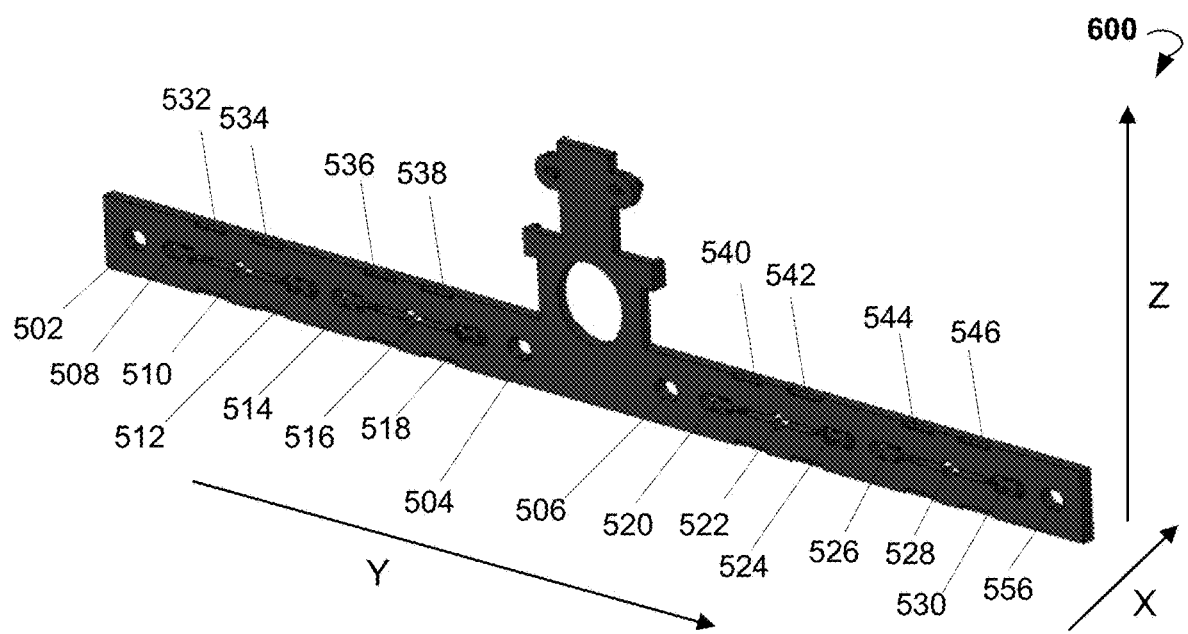
FIG. 6B is a rear angle view of the "single side" Y-connector.

FIG. 6A is a front angle view of a "single side" Y-connector 600, according to an example embodiment. FIG. 6B is a rear angle view of the Y-connector 600. The Y-connector 600 can be used to secure at least two adjacent submodules 100 along Y-axis only from the front side of the Y-connector 600. The Y-connector 600 may include tab 602 along Z-axis. The tab 602 may include projections 604, 606, 608 and 610 and aperture 610 along X-axis for securing the submodules 100. Similar to Y-connector 500, the Y-connector 600 may include slots 502, 504, 506, and 556, longitudinal slots 510, 516, 522, and 528 and locks 508, 512, 514, 518, 520, 524, 526, and 530. The groove cuts 532, 534, 536, 538, 540, 542, 544, and 546 (also referred as top groove cuts) are located on top of the rear side of the Y-connector 600. Bottom groove cuts similar to the top groove cuts 532, 534, 536, 538, 540, 542, 544, and 546 can be located at the bottom of the rear side of the Y-connector 600.

Figure 7:
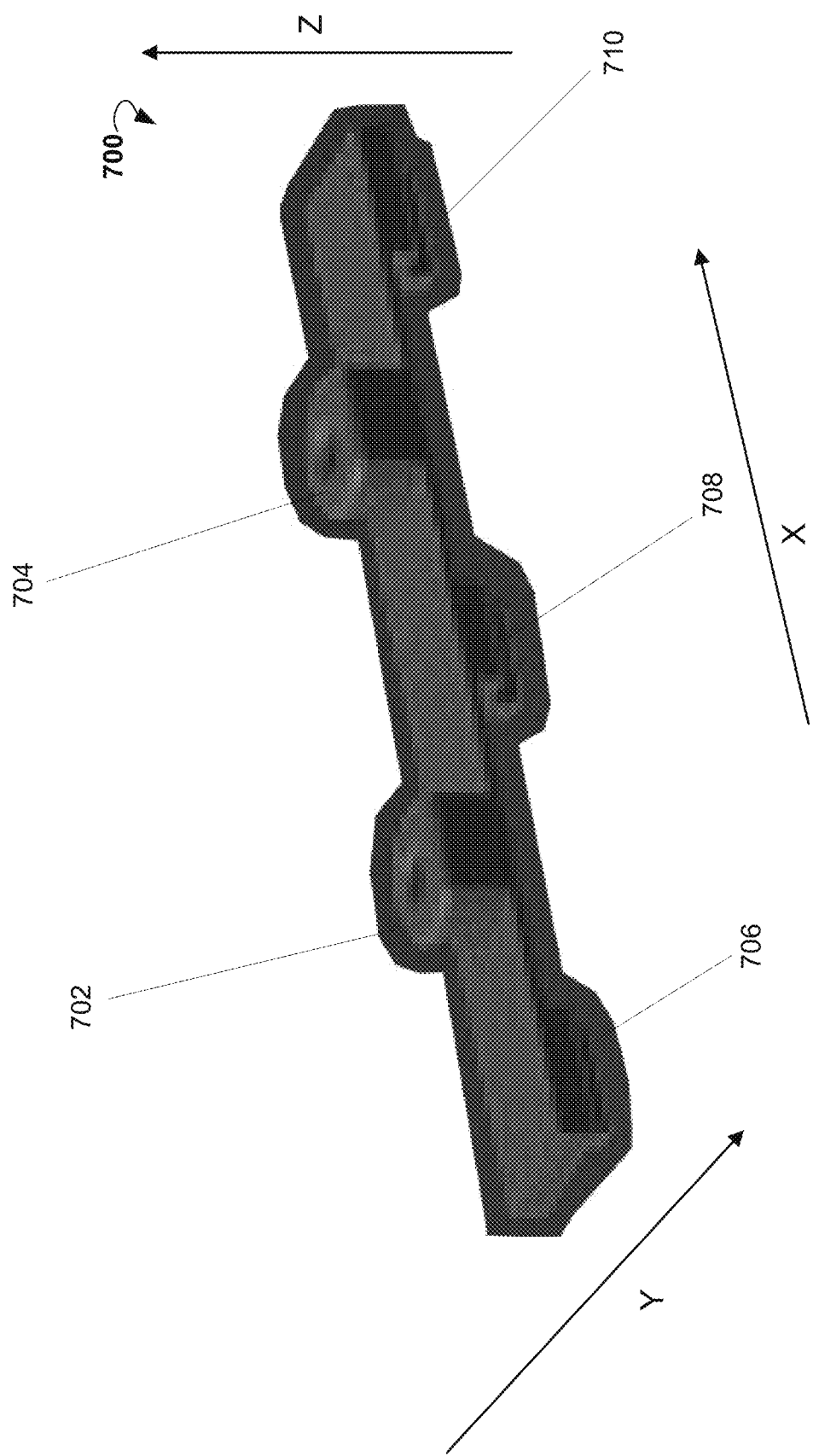
FIG. 7 is a top angle view of a Z-connector, according to an example embodiment.

FIG. 7 is a top angle view of a Z-connector 700, according to an example embodiment. The Z-connector 700 can be used to secure two adjacent submodules 100 along Z-axis. The Z-connector 700 may include a plate with projections 702 and 704 along Z-axis and projection 706, 708, and 710 in the direction opposite to the projections 702 and 704.

Figure 8A:
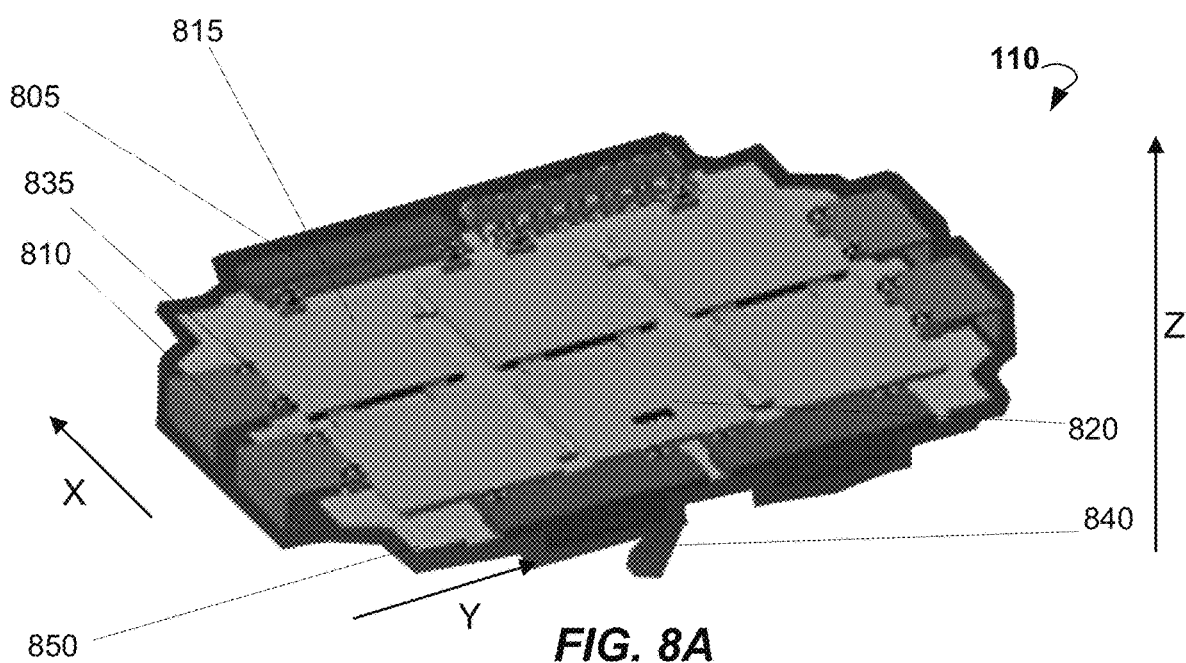
FIG. 8A is a top angle view of cover assembly, according to an example embodiment.

FIG. 8A is a top angle view of a cover assembly 110, according to an example embodiment. The cover assembly 110 may include plate 850, cover 820, one or more covers 815, one or more busbar covers 805, one or more busbar covers 810. The plate 850, cover 820, covers 815, busbar covers 805 and 810 can be made of plastic. The cover assembly 110 may include one or more plug-in features 835 to accept busbar covers 815 and busbar covers 805. The cover assembly 110 may further include a wire routing feature for low voltage cable routing and a built-in thermal coupler assembly 840 including resistors and connectors.

Figure 8B:
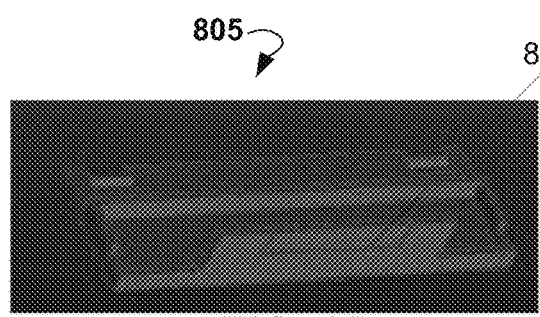
FIG. 8B is a bottom view of a busbar cover, according to one example embodiment.

FIG. 8B is a bottom view of a bus cover 805. The bus cover 805 may have a groove 865. When the bus cover is mounted on plate 850 of the cover assembly 110 and if there is a busbar between a first submodule and a second submodule adjacent to the first submodule along X-axis, the groove 865 of the bus cover 805 can be used to let the busbar go through.

Figure 8C:
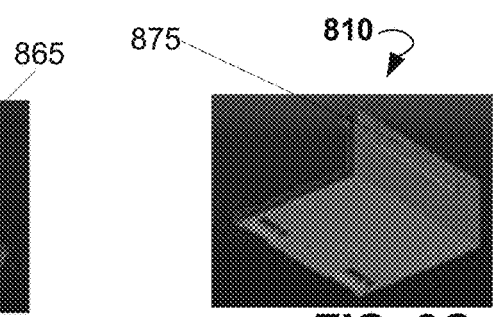
FIG. 8C is a bottom view of a busbar cover, according to another example embodiment.

FIG. 8C is a bottom view of the bus cover 810. The bus cover may have a groove 875. When the bus cover is mounted on plate 850 of the cover assembly 110 and if there is a busbar between a first submodule that is covered by the cover assembly and a second submodule adjacent to the first submodule along Y-axis, the groove 875 can be of the bus cover 810 can be used to let the busbar go through.

Figure 8D:
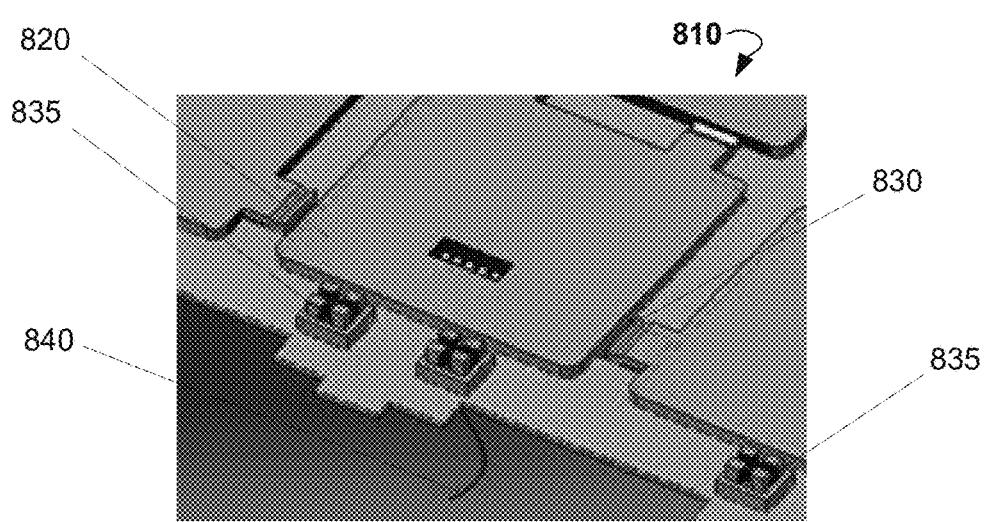
FIG. 8D is a close up view of a portion of a cover assembly.

FIG. 8D is a close up view of a portion of a cover assembly 110. This portion can include cover 820, plugin features 835, built-in thermal coupler assembly 840, and routing feature 830 for low voltage cable routing. The routing feature 830 can be clip fixed onto the cover 820. The built-in thermal coupler can be molded into the cover 820.

Figure 9A:
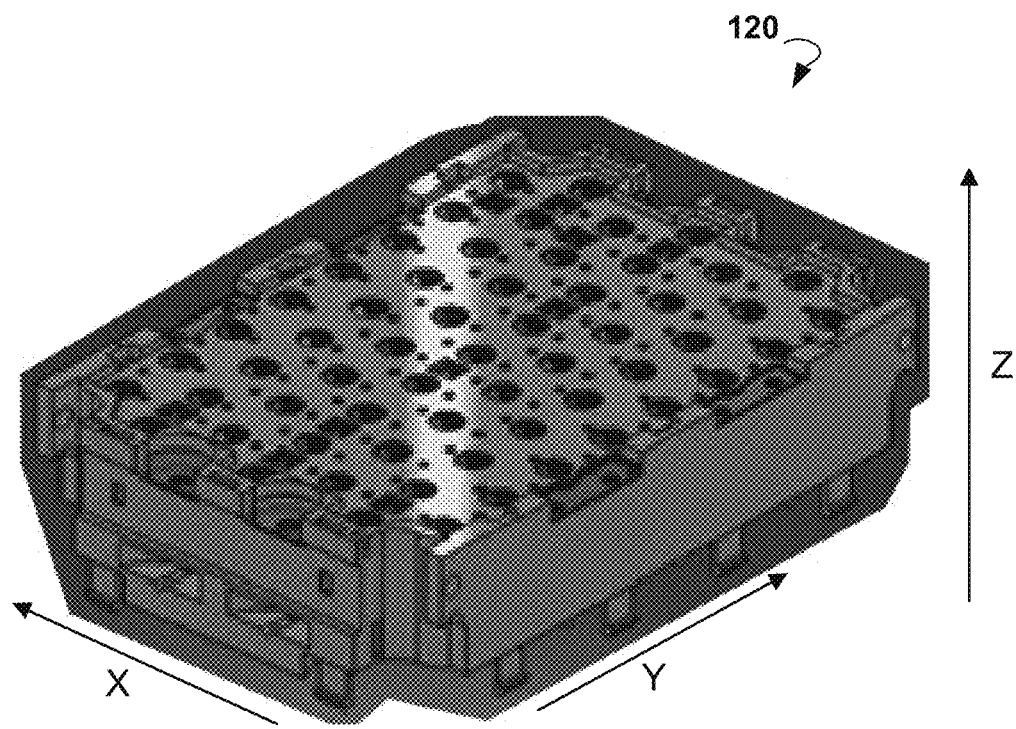
FIG. 9A is a top angle view of an electric connection assembly, according to an example embodiment.
Figure 9B:
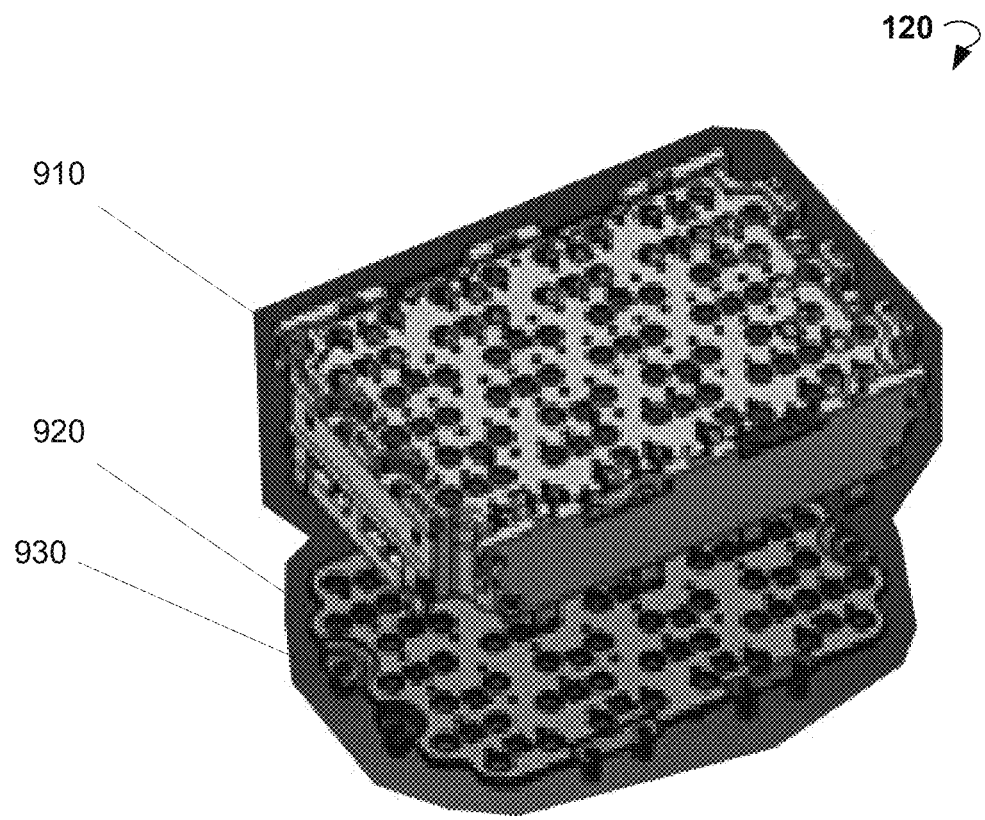
FIG. 9B is an exploded top angle view of an electric connection assembly.

FIG. 9A is a top angle view of an electric connection assembly 120, according to an example embodiment. FIG. 9B is top angle exploded view of the electric connection assembly 120. The electric connection assembly 120 can include a plastic body 910, a positive current collector 920, and negative current collector 930. The positive current collector 920 and the negative current collector 930 can be molded into the plastic body 920.

Figure 10A:
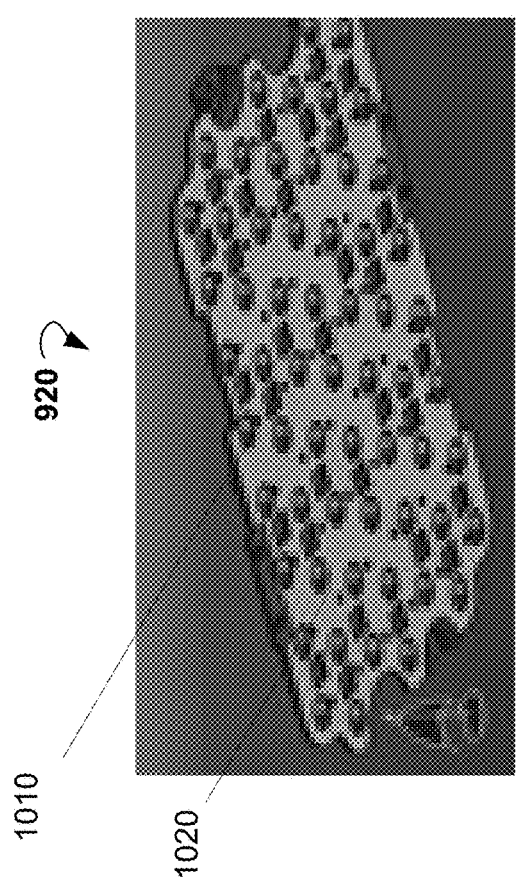
FIG. 10A is a top angle view of a positive current collector of the assembly.
Figure 10B:
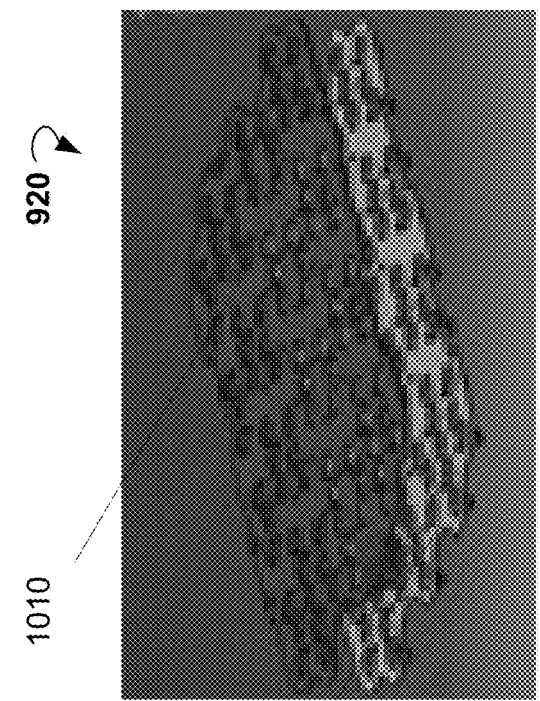
FIG. 10B is an exploded top angle view of a positive current collector.

FIG. 10A is a top angle view of the positive current collector 920 in the assembly. FIG. 10B is an exploded top angle view of the positive current collector 920. The positive current collector 920 includes a first part 1010 and a second part 1020 connected to each other. The first part 1010 can be thicker than the second part 1020. The second part 1010 can be configured for carrying electrical current. The second part 1020 can be made flexible to secure an elastic connection with anodes of cell batteries 140. In some instances, a current collector of the present technology has an elastic layer on the positive and negative current collector. As such, a positive current collector and negative current collector assembly may each have two layers—the current collector itself and an elastic layer. This way, a single current collector (negative or positive, respectively) can connect to batteries having different heights, which helps make the battery module more adaptable to different applications (e.g., different sized batter compartments and different battery sizes). Contact points on the second part 1020 for touching the anodes of the cell batteries 140 can be welded by a laser.

Figure 10C:
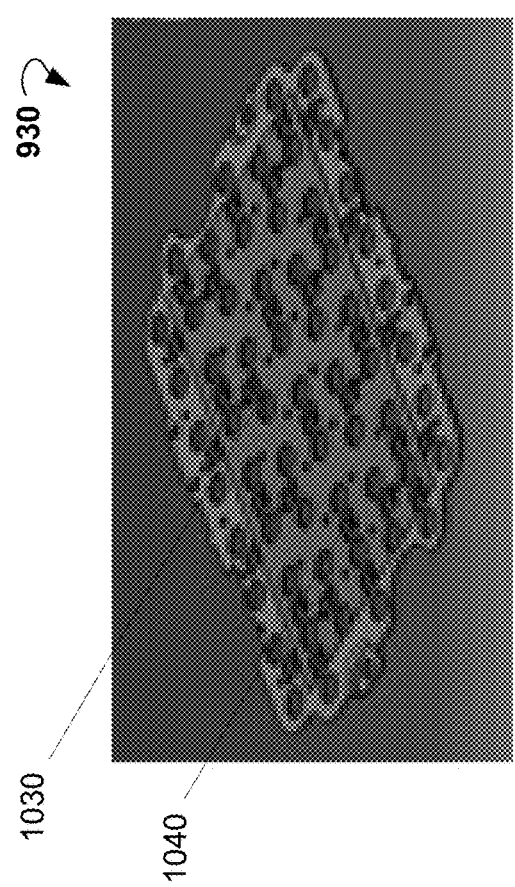
FIG. 10C is a top angle view of a negative current collector of the assembly.
Figure 10D:
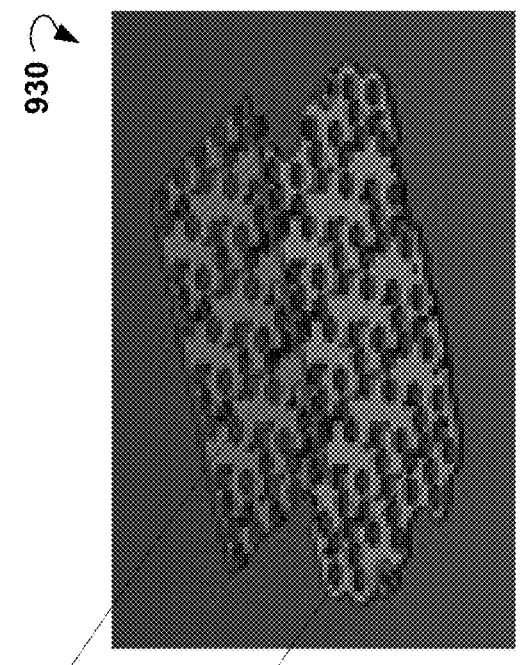
FIG. 10D is an exploded top angle view of a negative current collector.

FIG. 10C is top angle view of the negative current collector 930 in the assembly. FIG. 10D is an exploded top angle view of the negative current collector 920. The negative collector 930 may include a first part 1030 and a second part 1040 connected to each other. The first part 1030 is thicker than the part 1040. The first part 1030 is configured for carrying electrical current. The second part 1040 can be made flexible to secure an elastic connection with cathodes of the cell batteries 140. Contact points between on the second part 1040 for contacting cathodes of the cell batteries 140 can be welded by a laser.

FIG. 11 is a close up view of negative positive current collector 920 and negative current collector 930 in the assembly and contacting the cell batteries 140. The positive current collector 920 and the negative current collector 930 are isolated by a plastic isolation 1050 placed in between.

Figure 12A:
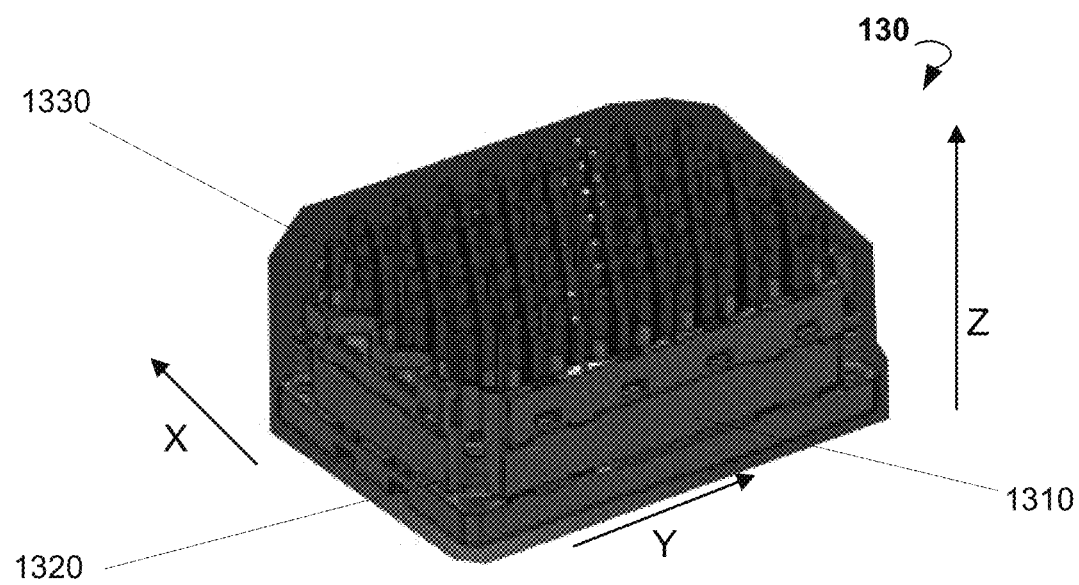
FIG. 12A is a top angle view of a cooling chamber assembly, according to an example embodiment.
Figure 12B:
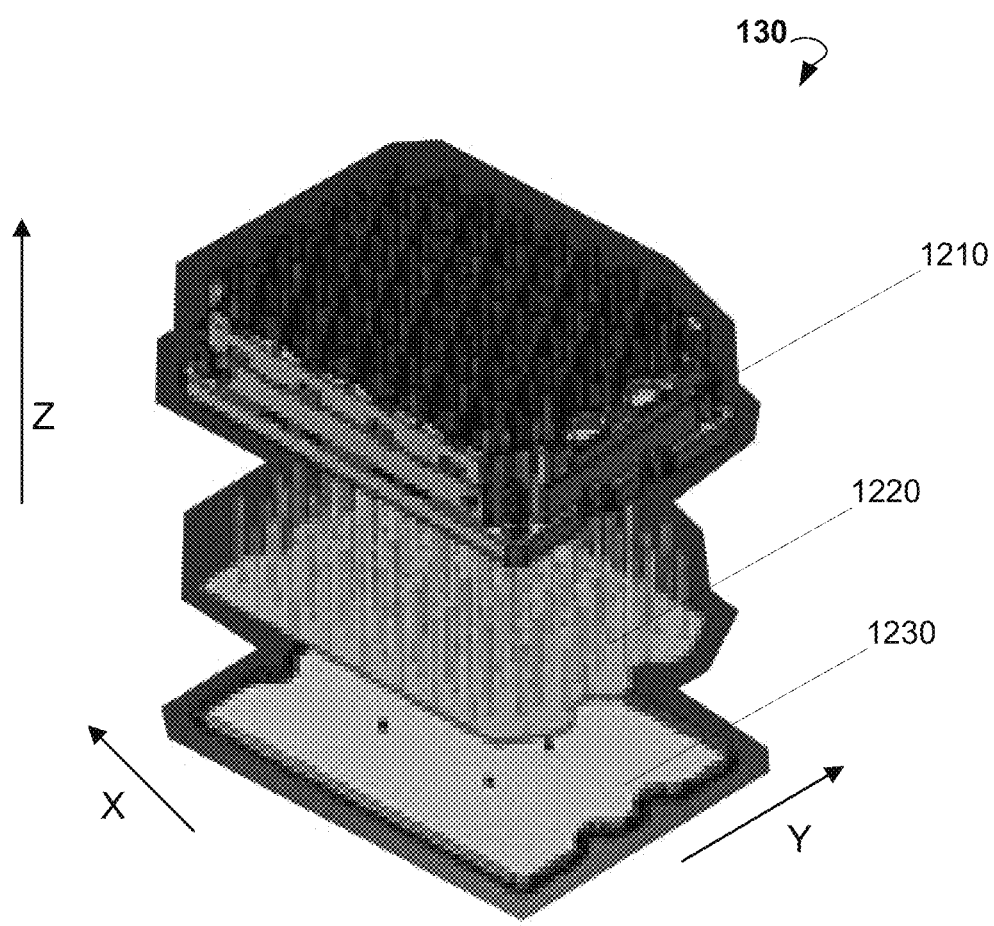
FIG. 12B is an exploded top angle view of a cooling chamber assembly.

FIG. 12A is a top angle view of a cooling chamber assembly 130, according to an example embodiment. FIG. 12B is an exploded top angle view of the cooling chamber assembly 130. The cooling chamber assembly 130 may include a plastic assembly 1210, metal separator 1220, and an injection bottom cover 1230. The metal separator 1220 may include water nozzles. The injection bottom cover 1230 can be ultrasonic welded to the bottom of the plastic assembly 1210 to provide a waterproof seal.

Figure 13A:
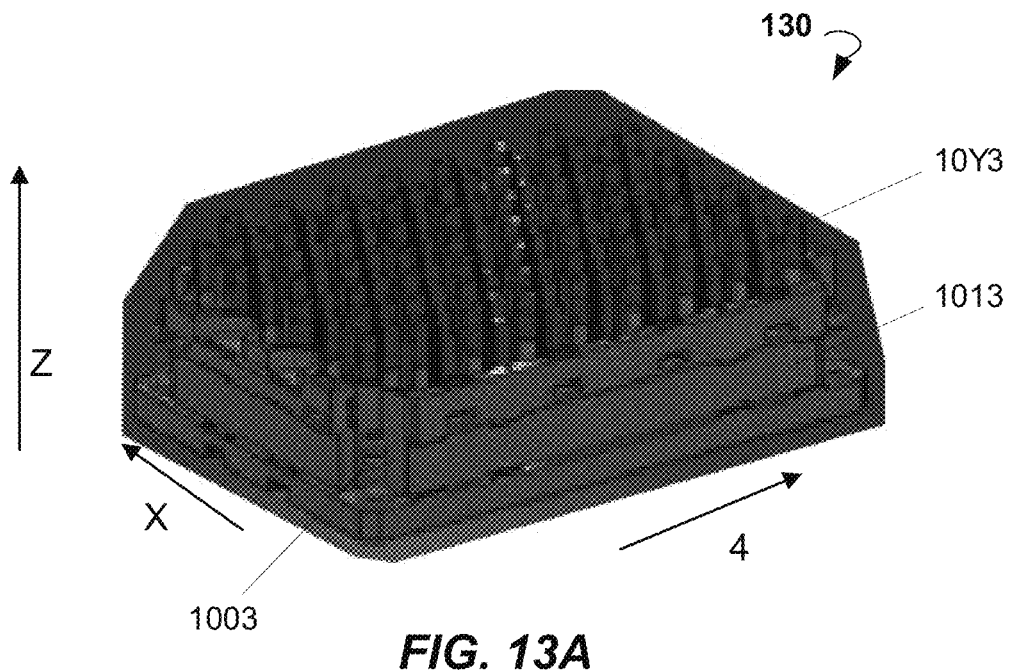
FIG. 13A is a top angle view of a plastic assembly.
Figure 13B:
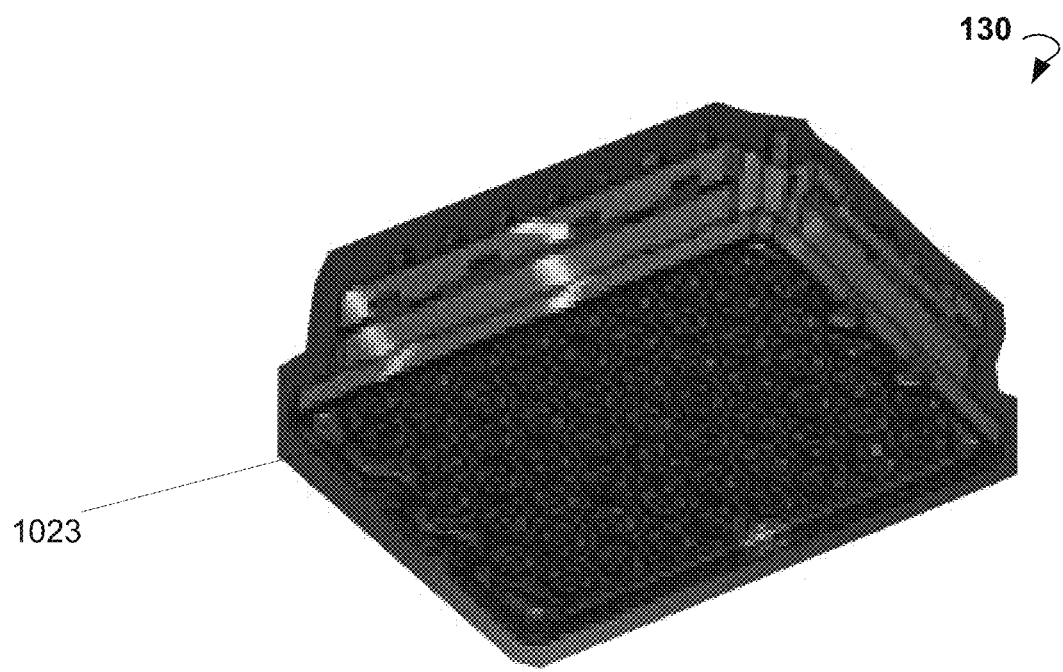
FIG. 13B is a bottom angle view of a plastic assembly.

FIG. 13A is a top angle view of the plastic assembly 1210. FIG. 13B is a bottom angle view of the plastic assembly 1210. The plastic assembly 1210 can be carried out by transfer molding. The plastic assembly may include a plastic housing 1310, a thermal plastic body 1310, first thermal plastic parts 1320, water inlets and outlets 1330, and second thermal plastic parts 1340.

The first thermal plastic parts 1320 and the second plastic parts 1340 can be made of material having a thermal conductivity of at least 10 watts per megakelvin. The first thermal plastic parts 1320 can be in direct contact with hottest portions of cell batteries 140 for cooling. The second plastic parts 1340 can be configured to cool bottom of the cell batteries 140.

Figure 14B:
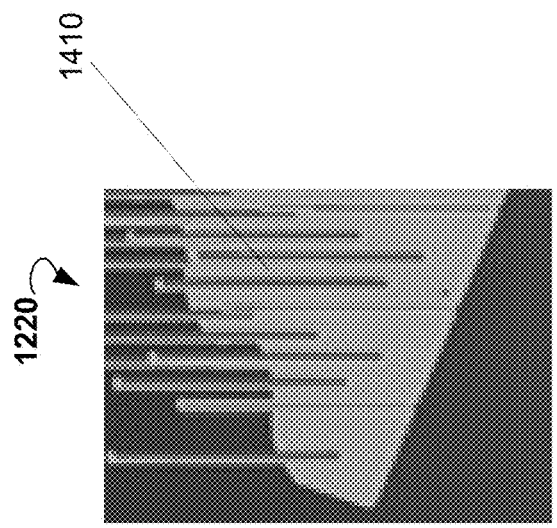
FIG. 14B is a close up view of a portion of a metal separator.
Figure 14D:
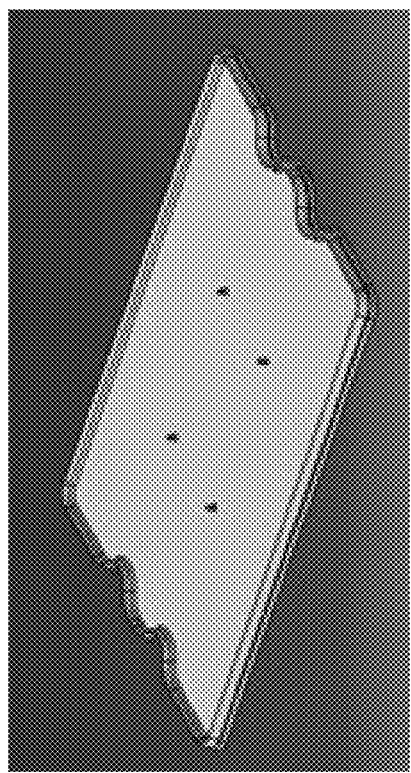
FIG. 14D is a top angle view of an injection bottom cover.
Figure 14A:
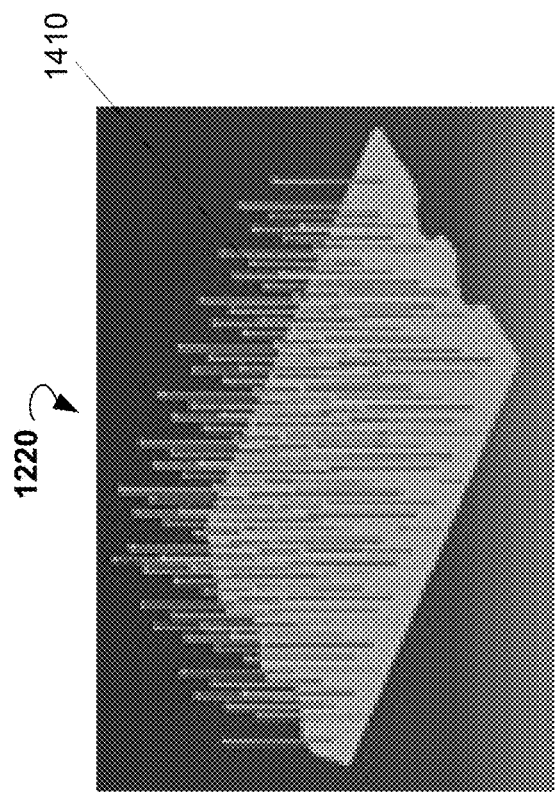
FIG. 14A is a top angle view of a metal separator.

FIG. 14A is a top angle view of the metal separator 1220. FIG. 4B is a close up view of a portion of the metal separator 1220. The metal separator 1220 can be made of aluminum.

The metal separator 1220 may include hollow pipes 1410 that can be inserted in cavities of plastic housing 1310 to provide circulation of water.

Figure 14C:
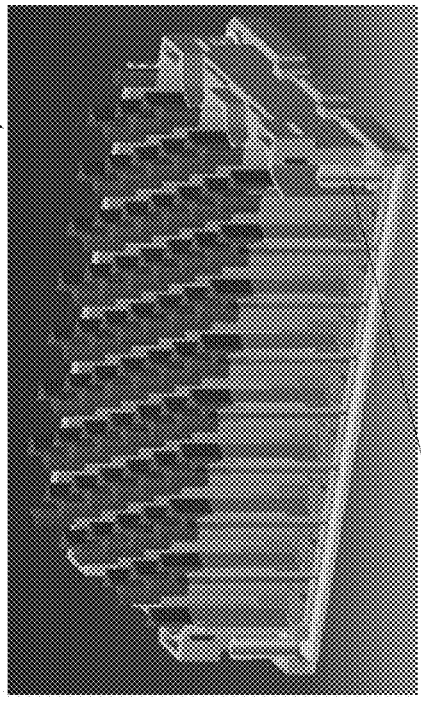
FIG. 14C is a section cut of a plastic assembly.

FIG. 14C is a section cut of the plastic assembly 1210. The plastic assembly 1210 includes water insets and outlets 1330. The water insets and outlets 1330 can be inserted in the plastic assembly 1210 by molding.

FIG. 14D is a top angle view of the injection bottom cover 1230. The injection bottom cover 1230 can be made of plastic. The injection bottom cover 1230 may include ultrasonic welded features for sealing water and holding the metal separator 1220 in place.

Figure 15A:
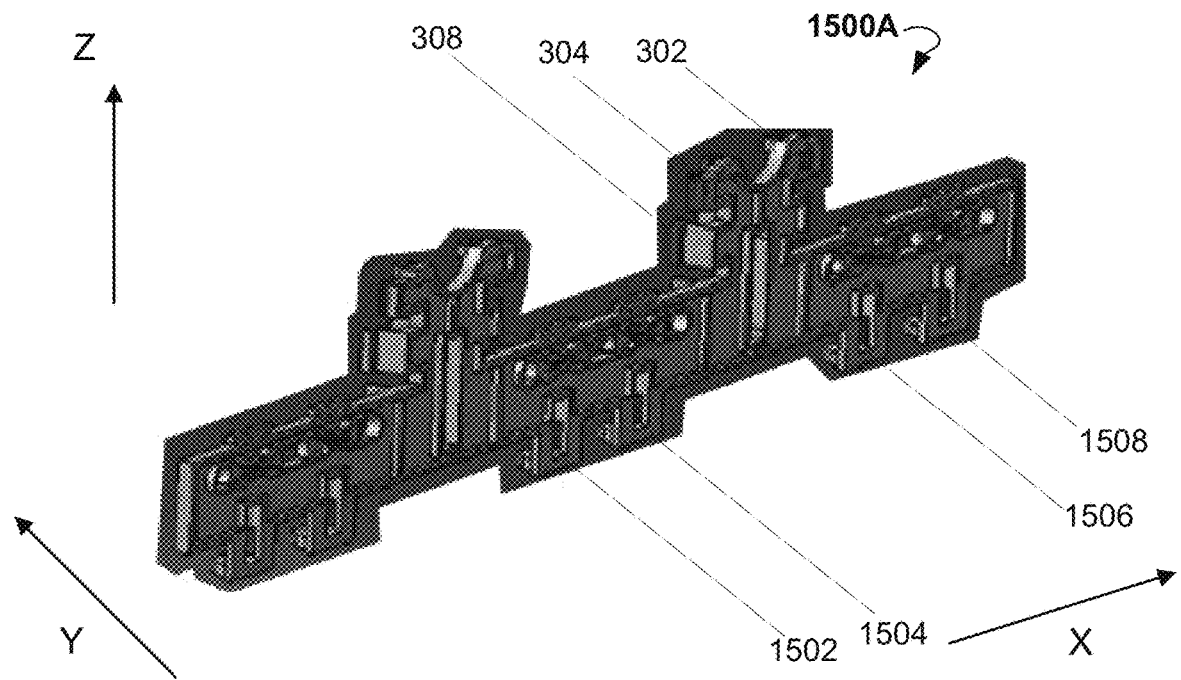
FIG. 15A is a rear angle view of a "single side" X-connection, according to an example embodiment.

FIG. 15A is a rear angle view of an X-connection 1500A, according to an example embodiment. The X-connection 1500A includes connection features similar to connecting feature of the X-connection 400. The X-connection 1500A includes projections 302 and 304 and projection 308 and 306 (obscured in the FIG. 15A). The X-connection 1500A also includes projections 1502, 1504, 1506, and 1508 which are similar to projections 322, 324, 328, and 326 of the X-connection 400 shown in FIG. 4. The projections 1502, 1504, 1506, and 1508 may be connected to supporting features at bottom of submodules.

Figure 15B:
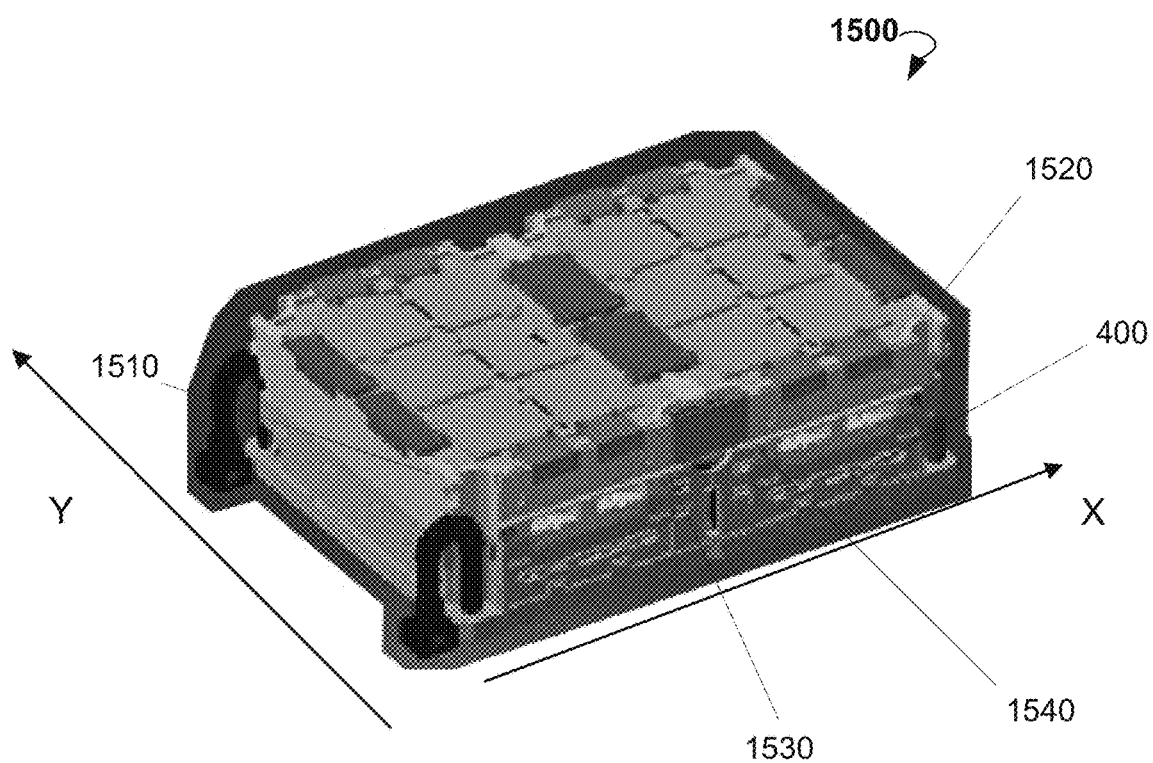
FIG. 15B is a top angle view of a scalable battery module including two submodules.

FIG. 15B is a top angle view of a scalable battery module 1500B including two submodules 1510 and 1520 connected by the X-connector 1500A. The submodule 1510 may include a pocket 1530 on a side along X-axis. The submodule 1510 may include a pocket 1540 on a side along X-axis. The projection 302 of the X-connector 1500A can be inserted in the pocket 1540 and the projection 304 of the X-connector 1500A can be inserted in the pocket 1530, thereby keeping the submodule 1510 and the submodule 1520 aligned to each other along X-axis.

Additionally, the projection 306 (obscured, shown in FIG. 4A) of the X-connector 1500A can be inserted into a pocket of the submodule 1520 on the side along Y-axis. The projection 308 of the X-connector 1500A can be inserted into a pocket of the submodule 1510 on the side along Y-axis.

Figure 16A:
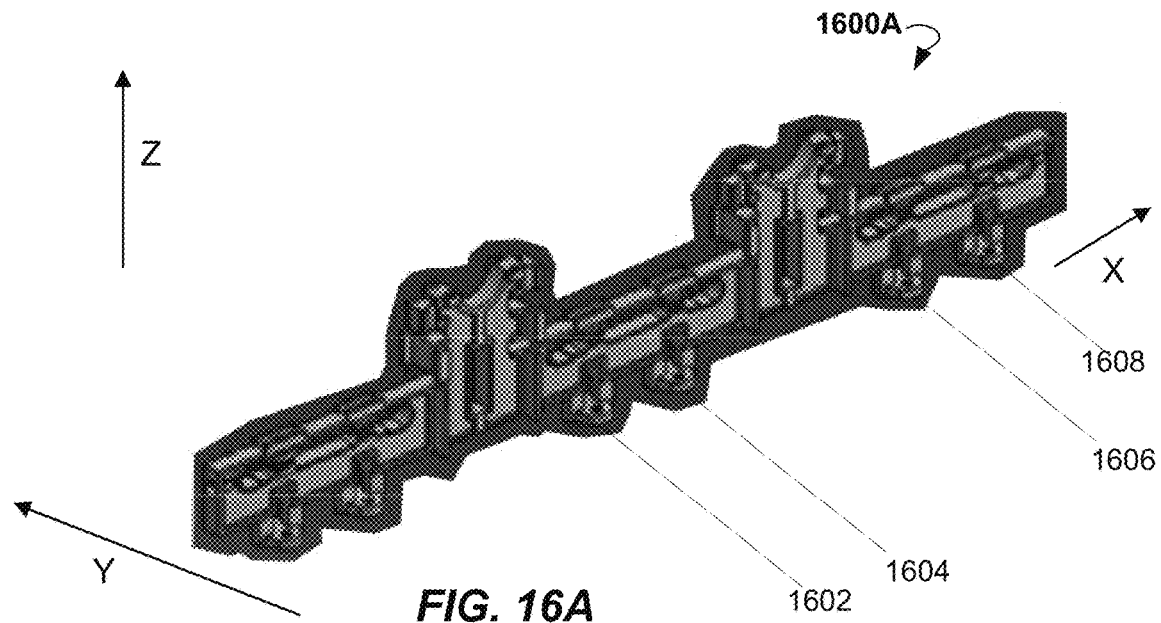
FIG. 16A is a top angle view of a "double side" Y-connector, according to an example embodiment.

FIG. 16A is a top angle view of a Y-connector 1600A, according to an example embodiment. The Y-connector 1600A may include connecting features similar to the connecting features of the Y-connector 300. The Y-connection 1600A may also include projections 1602, 1604, 1606, and 1608, which are similar to projections 1502, 1504, 1506, and 1508 of the X-connection 1500A shown in FIG. 15A. The difference between the projections 1602, 1604, 1606, and 1608 and the projections 1502, 1504, 1506, and 1508 is that the projections 1602, 1604, 1606, and 1608 are symmetrical with respect to Y-axis to allow for connecting the projections 1602, 1604, 1606, and 1608 to submodules on both sides of the Y-connector 1600A.

Figure 16B:
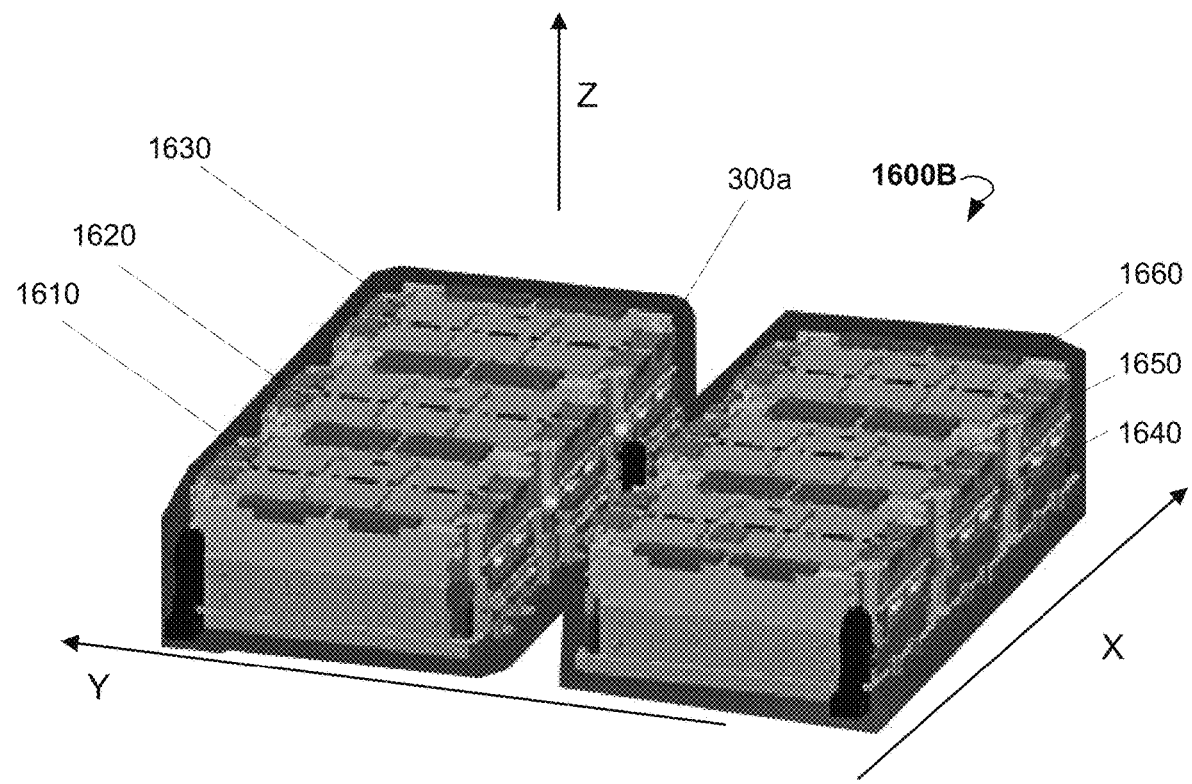
FIG. 16B is a top angle view of scalable battery module including six submodules, exploded in the Y direction.

FIG. 16B is a top angle view of scalable battery module 1600A including six submodules connected by the X-connector 1600A. The submodules 1610, 1620, and 1630 are connected at the rear side of the X-connector 1600A. The submodules 1640, 1650, and 1660 are to be connected at the front side of the X-connector 1600A.

Figure 17:
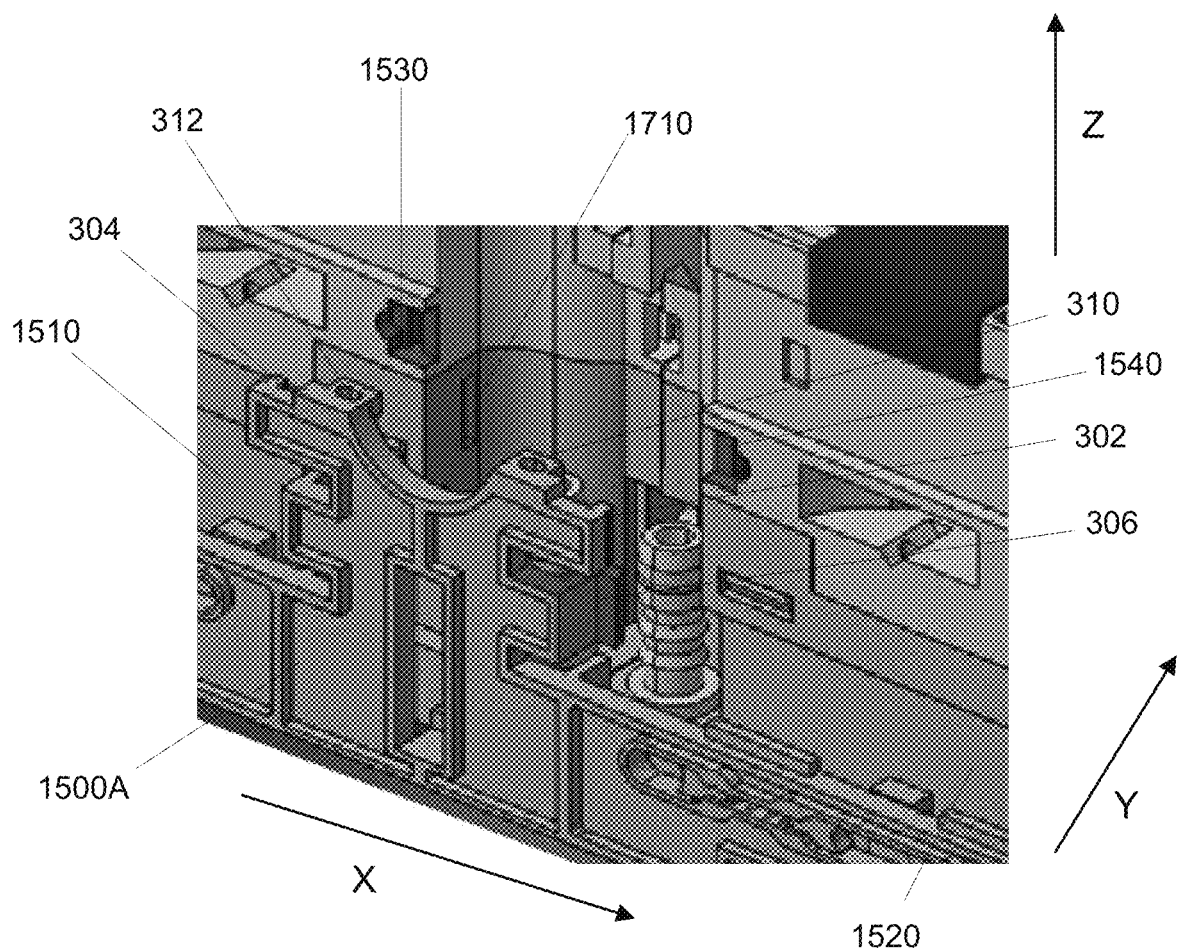
FIG. 17 is a close up view of an X-connector and submodules.

FIG. 17 is a close up view of the X-connector 1500A and the submodules 1510 and 1520. The projection 302 of the X-connector 1500A can be inserted in the pocket 1540 of the submodule 1520 and the projection 304 can be inserted in the pocket 1540 of the submodule 1520. The projection 308 can be inserted in the pocket 1710 of the submodule 1510. The pocket 1710 is located on the side of the submodule 1510 along Y-axis. The projection 306 can be inserted into a pocket (obscured in FIG. 17) of the submodule 1520 located on the side along Y-axis and across from the pocket 1710. FIG. 17 also shows pockets 310 and 312 located in the X-connector along Z-axis.

Figures 18A, 18B:
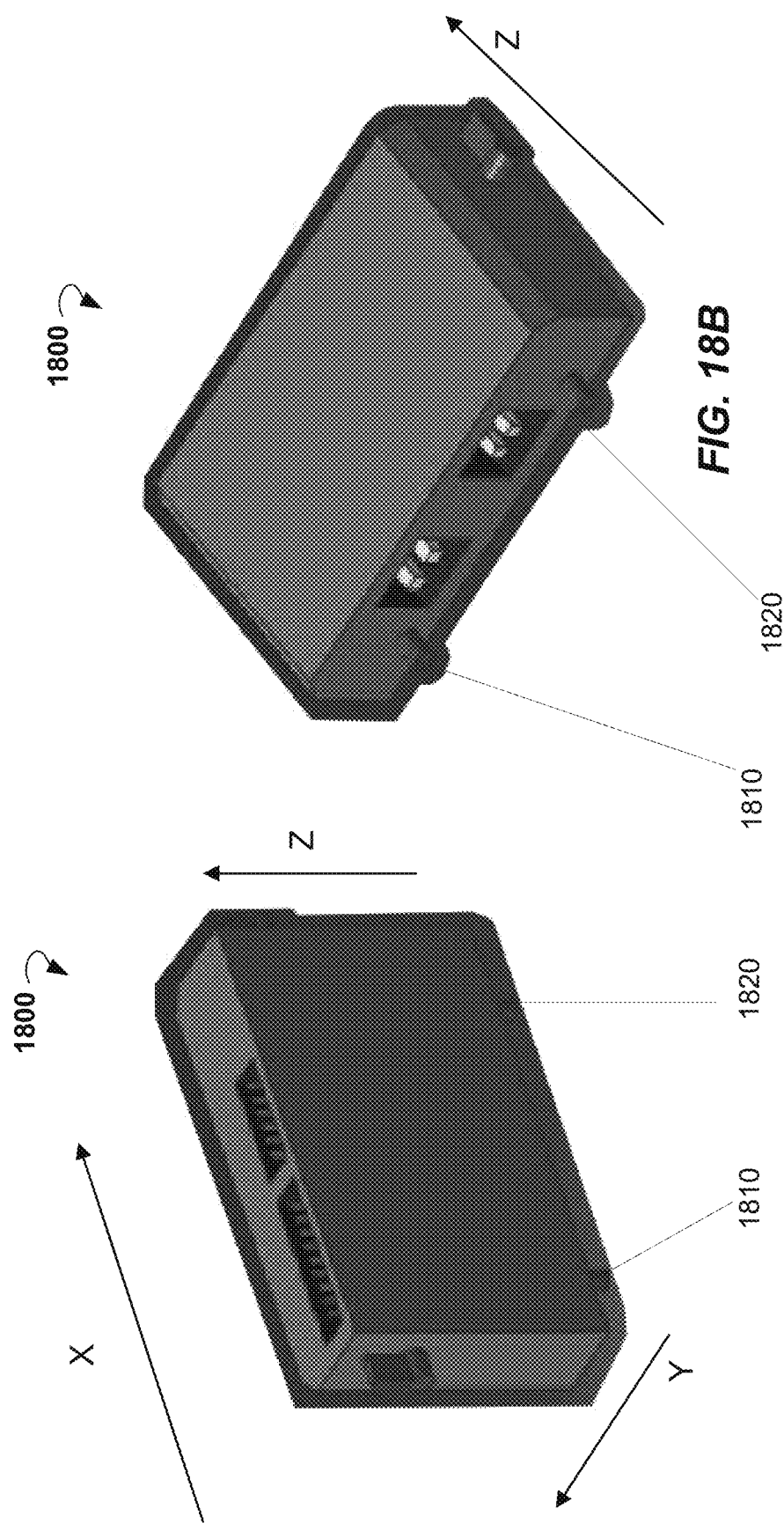
FIG. 18A is a top angle view of a battery management unit (BMU), according to an example embodiment.
FIG. 18B is a bottom angle view of the BMU.

FIG. 18A is a top angle view of a BMU 1800, according to an example embodiment. FIG. 18B is a bottom angle view of the BMU 1800. The BMU 1800 may include a projection 1810 and a projection 1820 at bottom and along Z-axis.

Figure 19:
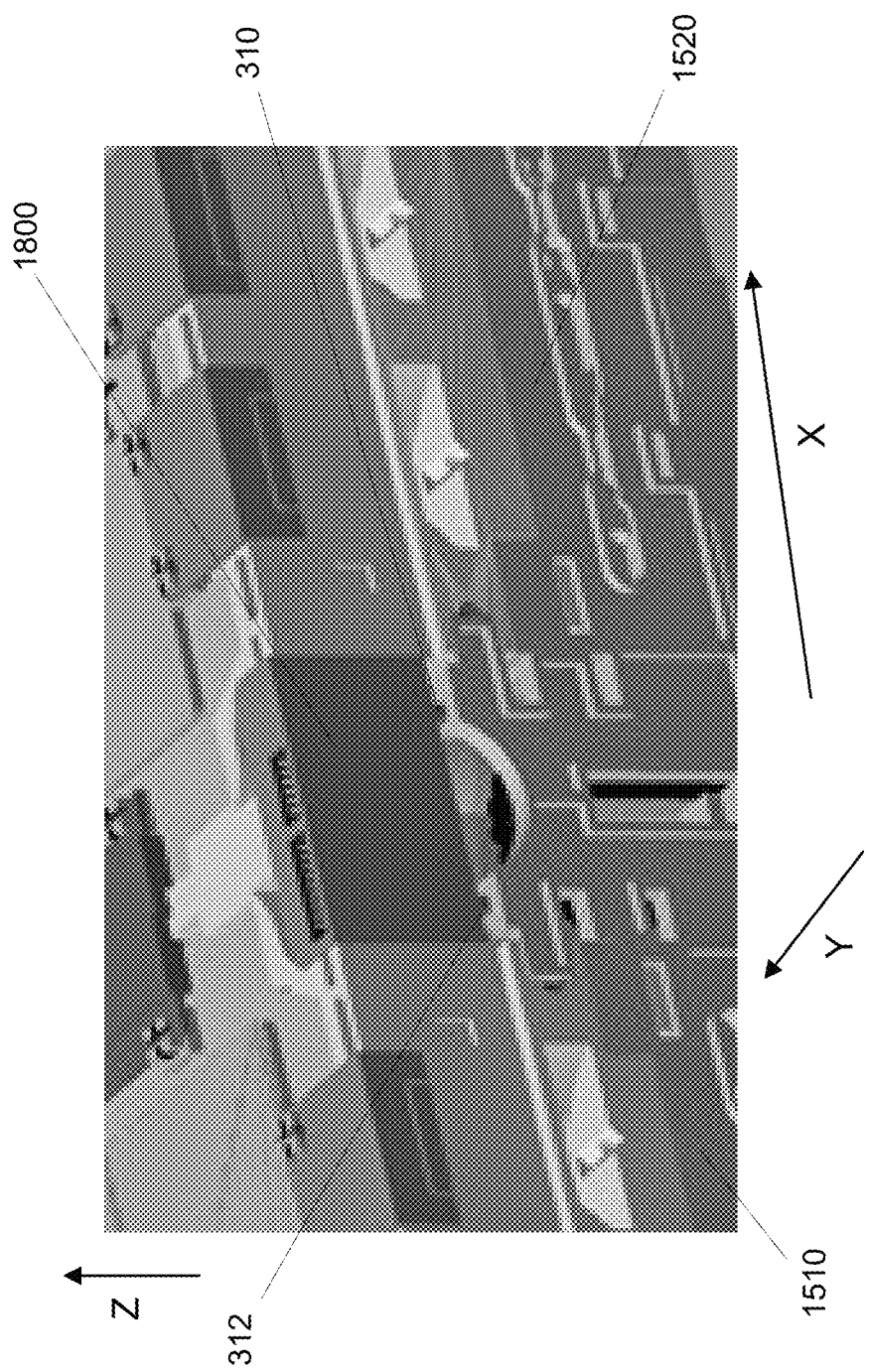
FIG. 19 is close up view of a scalable battery module including the X-connector, submodules, and the BMU.

FIG. 19 is a close up view of a scalable battery module 1900. The module 1900 includes the X-connector 1500A, the submodules 1510 and 1520, and the BMU 1800. The pockets 310 and 312 located on the X-connector 1500A along Z-axis. The projection 1810 (shown in FIG. 18B) of BMU 1800 can be inserted into the pocket 310 of the X-connector 1500A. The projection 1820 (shown in FIG. 18B) of BMU 1800 can be inserted into the pocket 330 of the X-connector 1500A.

FIG. 20A is a close up view of a scalable battery module 2000A. The module 2000A includes the X-connector 1500A and the submodules 1510 and 1520. The submodule 1510 includes a support feature 2010. The submodule 1520 includes a support feature 2012 and a support feature 2014. The support feature 2010 may be connected to the projection 1504 of the X-connector 1500A. The support feature 2012 may be connected to the projection 1506 of the X-connector 1500A. The support feature 2014 may be connected to the projection 1508 of the X-connector 1500A. The connections between support features 2010, 2012, and 2014 and the projections 1504, 1506, and 1508 may secure alignment of the submodules 1510 and 1520 along X-axis.

FIG. 20B is a section cut of the submodule 1520. FIG. 20C is another section cut of the submodule 1520. As shown in FIG. 20B and FIG. 20C, the tab 316 of the X-connector 1500A can be inserted in slot 2010 of the submodule 1520. The tabs of the X-connector 1500A can be inserted in slots of the submodules 1510 and 1520 to provide restrain along Y-axis.

Figure 21A:
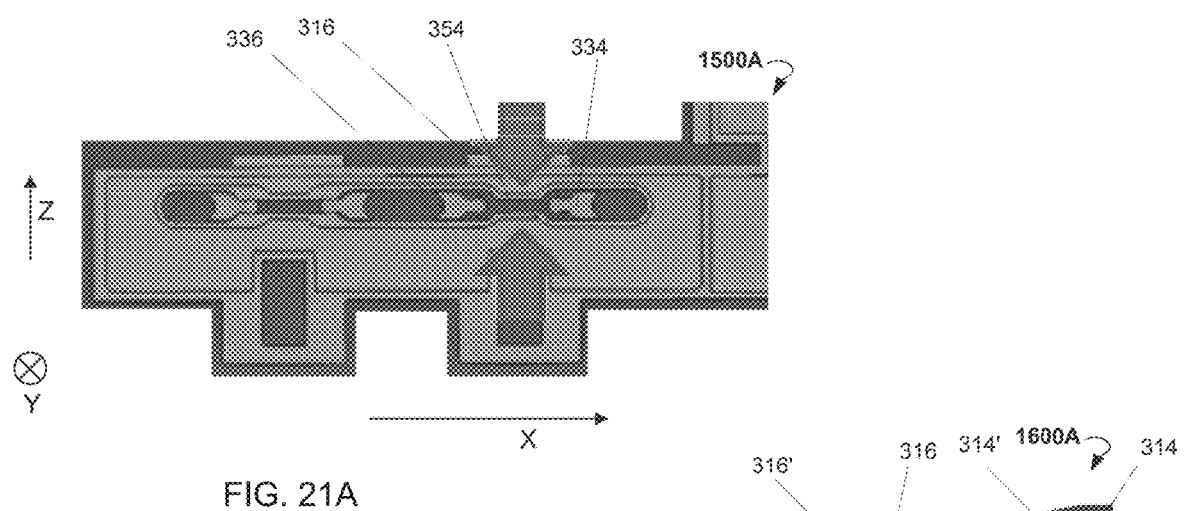
FIG. 21A is a close up view of a portion of an X-connector.

FIG. 21A is a close up view of a portion of the X-connector 1500A. The tab 316 of the X-connector 1500A can be inserted into the slot 2010 (shown in FIG. 20B and FIG. 20C) of the submodule 1520 by first releasing locks 336 and 334 from the slot 354 and squeezing the slot 354. After the tab 316 is placed within the slot 2010, the locks 336 and 334 can be moved in the slot 354 to push the tab 316 further up in the slot 2010 and support the tab 316 in place.

Figure 21B:
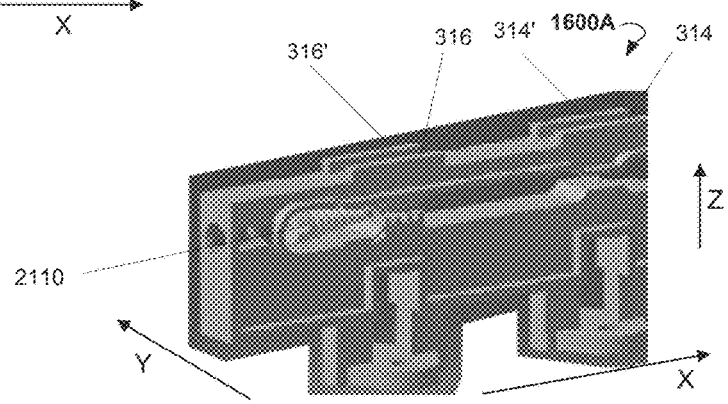
FIG. 21B is a close up view of a portion of an X-double connector.

FIG. 21B is a close up view of the X-double connector 1600A. The tab 316 can be inserted in the slot 2010 (shown in FIG. 20B and FIG. 20C) of the submodule 1520. The X-connector 1600A may further include a plastic screw 2110 located in a slot under the tab 316. The tab 316 can pushed up and locked into position of the slot 2010 by turning the plastic screws 2110. The tabs can be pushed up to be kept in the locking position. Plastic screws similar to the plastic screw 2110 can be used to secure the tab 314 in a slot of the submodule 1520 and tabs 316' and 314' of slots of a submodule adjacent to the submodule 1520 along the Y-axis. In some instances, the double connector can be used on between submodules, screw 2100 is reachable from outside of the module while slot 314 is in the middle of modul, and no screw is needed at that location unless only one submodule is connected in the X direction.

Figure 22:
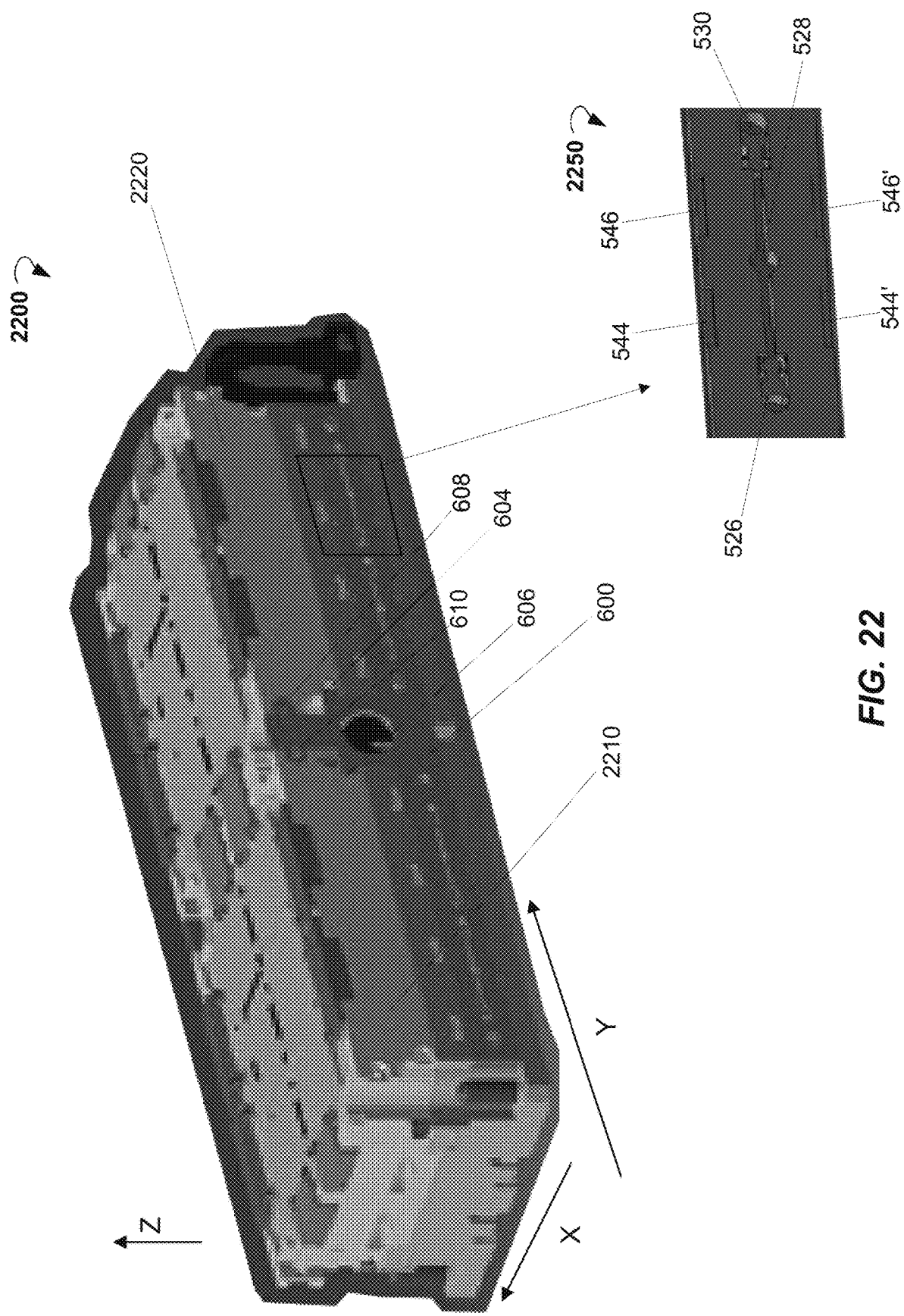
FIG. 22 is a top angle view of a scalable battery module, according to an example embodiment.

FIG. 22 is a top angle view of a scalable battery module 2200. The scalable battery module 2200 includes a submodule 2210 and a submodule 2220 connected by a Y-connector 600. The Y-connector 600 is described in more detail with reference to FIG. 6A and FIG. 6B. To secure alignment of submodules 2210 and 2220 along Y-axis, the projections 606 and 610 of the Y-connector 600 can be inserted into pockets of the submodule 2210 and the projections 604 and 608 can be inserted into pockets of the submodule 2220. To secure alignment of the Y-connector 600 to the submodules 2210 and 2220, the top groove cuts 532, 534, 536, 538, 540, 542, 544, 546 (shown in FIG. 6A and FIG. 6B) and bottom groove cuts of the Y-connector 600 can be inserted into slots of the submodules 2210 and 2220. The close-up view 2250 shows the top groove cuts 544 and 546, bottom groove cuts 544' and 546', which are symmetrical to the top groove cuts 544 and 546, the slot 528, and the locks 526 and 530. To insert the top groove cuts 544 and 546 and the bottom groove cuts 544' and 546' into the slots of the submodule 2220, the slot 528 can be squeezed. The slot 528 can be released after the top groove cuts and the bottom groove cuts are placed into the slots of the submodule 2220. The locks 526 and 530 can be then moved into the slot 528 to push the top groove cuts up and the bottom groove cuts down and secure the top groove cuts up and the bottom groove cuts in the slots of the submodule 2220.

Figure 23A:
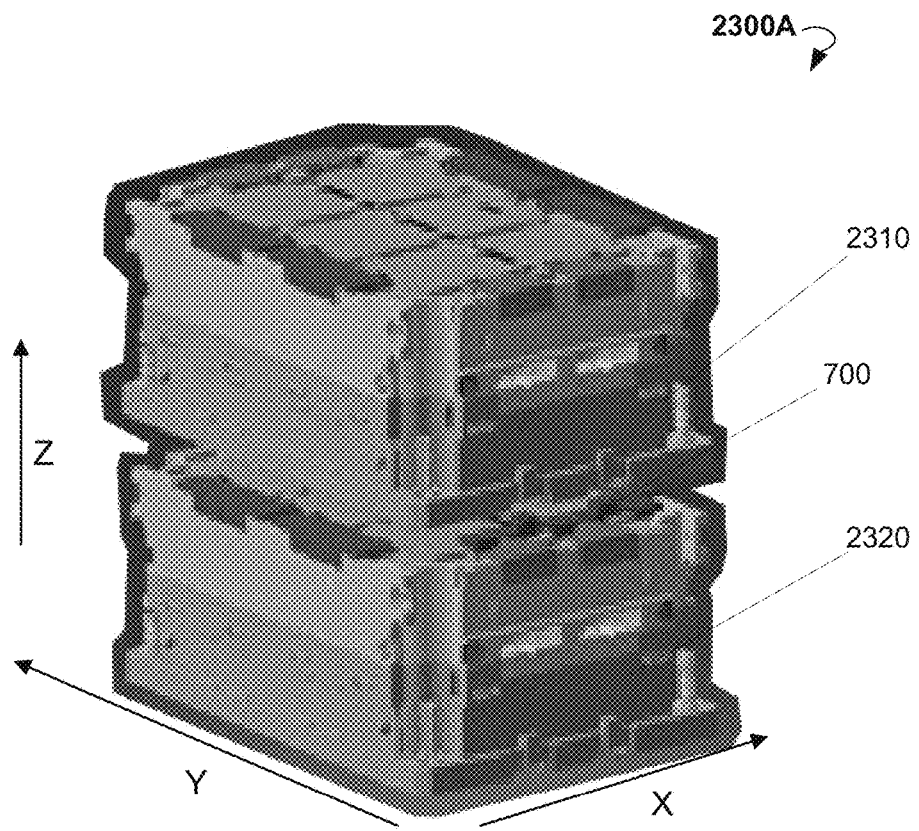
FIG. 23A is a top angle view a scalable battery module, exploded in the Z direction according to an example embodiment.

FIG. 23A is a top angle view a scalable battery module 2300. The scalable battery module 2300 includes two submodules 2310 and 2320 and Z-connector 700. The Z-connector 700 is described in more detail with reference to in FIG. 7 above. The Z-connector 700 can be placed between the bottom of the submodule 2310 and the top of the submodule 2320.

Figure 23B:
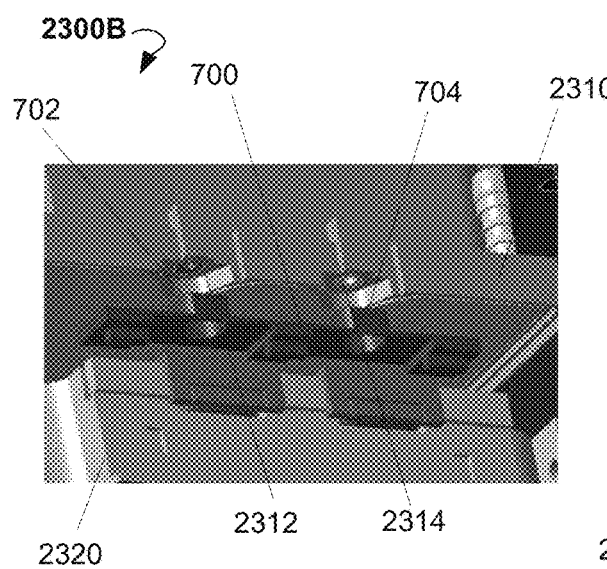
FIG. 23B is a close up view of the scalable battery module, according to an example embodiment.

FIG. 23B is a close up view of the scalable battery module 2300. The projections 702 and 704 of the Z-connector 700 can be inserted in the slots 2312 and 2314 at the bottom of the submodule 2310. The slots 2312 and 2314 can be located in the cooling chamber assembly of the submodule 2310.

Figure 23C:
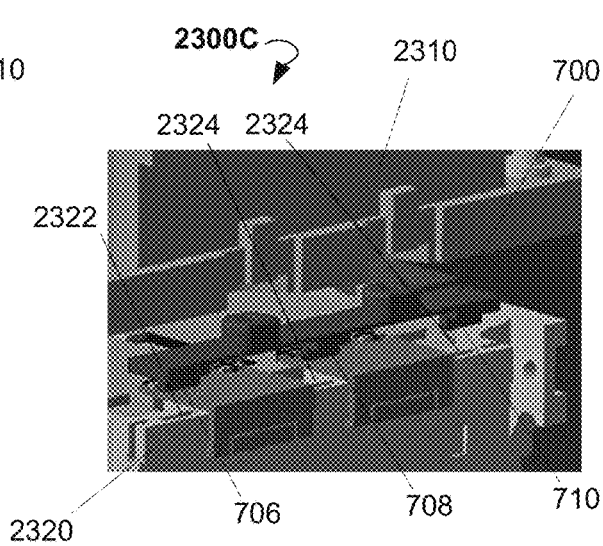
FIG. 23C is another close up view of a scalable battery module, according to an example embodiment.

FIG. 23C is another close up view of the scalable battery module 2300. The projections 706, 708, 710 can be inserted into slots 2322, 2324, and 2326 on the top of the submodule 2320. The slots 2322, 2324, and 2326 can be located inside the plastic body of an electric connection assembly of the submodule 2320.

Figure 24A:
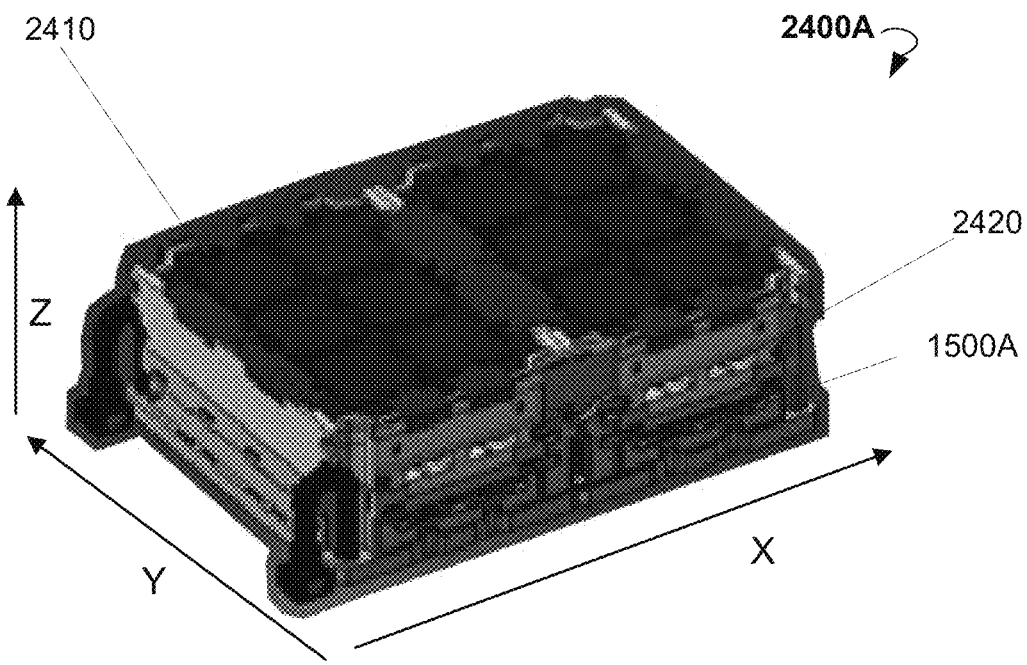
FIG. 24A is a top angle view of a scalable battery module, according to an example embodiment.

FIG. 24A is a top angle view of an example scalable battery module 2400A. The scalable battery module 2400A can include two submodules 2410 and 2420 connected along X-axis by using one or more X-connectors 1500A. One of the X-connectors 1500A can be disposed on the front size of the scalable battery module 2400A to secure positions of front sides of the submodules 2410 and 2420 along X-axis. Another X-connector 1500A can be disposed on the rear side of the scalable battery module 2400A to secure positions of rear sides of the submodules 2410 and 2420 along X-axis.

Figure 24B:
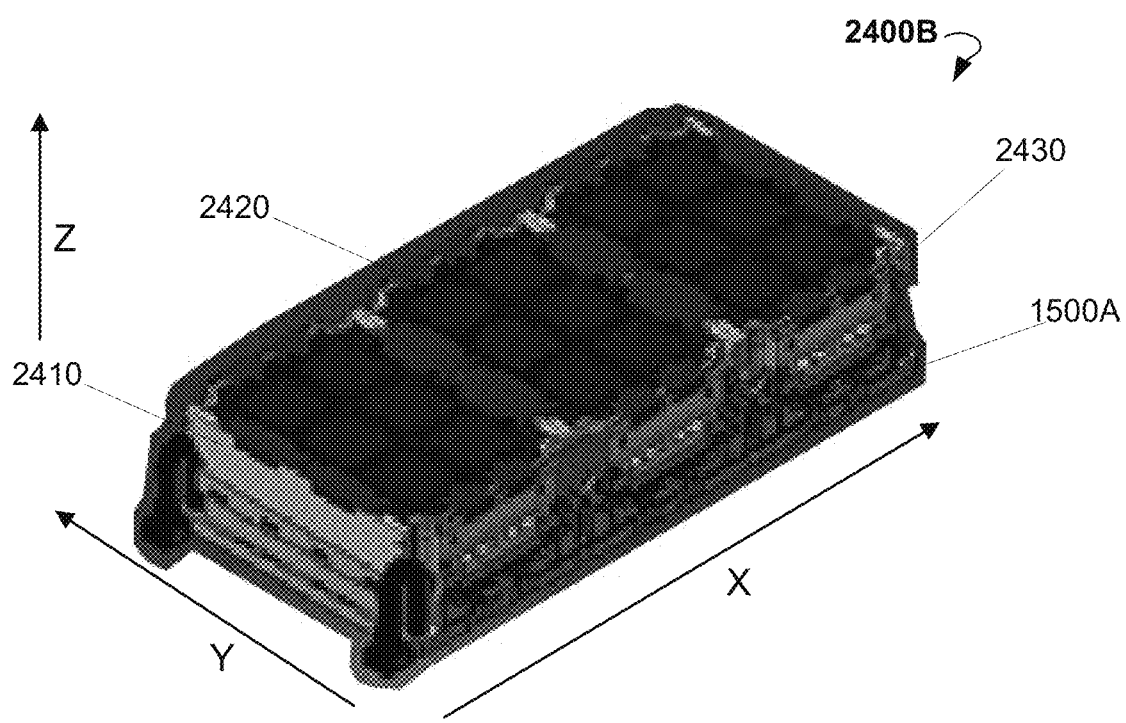
FIG. 24B is a top angle view of a scalable battery module, according to an example embodiment.
Figure 25A:
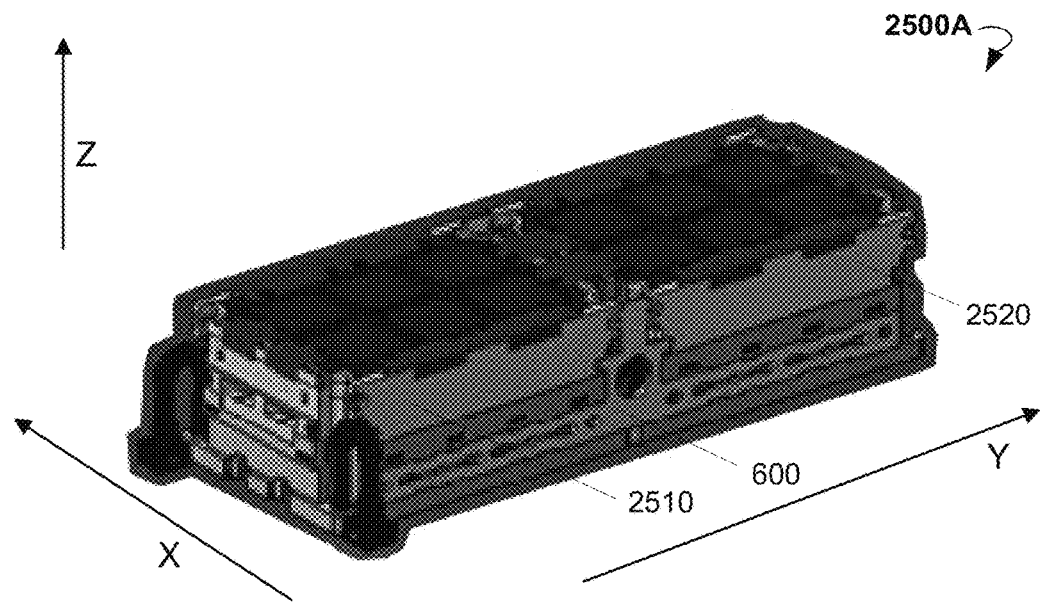
FIG. 25A is a top angle view of a scalable battery module, according to an example embodiment.

FIG. 24B is a top angle view of an example scalable battery module 2400B. The scalable battery module 2400B can include three submodules 2410, 2420, and 2430 connected along X-axis by using the X-connector 1500A. One of the X-connectors 1500A can be disposed on the front size of the scalable battery module 2400B to secure positions of the front sides of submodules 2410, 2420, and 2430 along X-axis. Another X-connector 1500A can be disposed on the rear side of the scalable battery module 2400B to secure positions of rear sides of the submodules 2410, 2420, and 2430 along X-axis FIG. 25A is a top angle view of an example scalable battery module 2500A. The scalable battery module 2500A can include two submodules 2510 and 2520 connected along Y-axis by using one or more Y-connectors 600. One of the Y-connectors 600 can be disposed on the front size of the scalable battery module 2500A to secure positions of front sizes of the submodules 2510 and 2520 along Y-axis. Another Y-connector 600 can be disposed on the rear side of the scalable battery module 2500A to secure positions of the rear sides of the submodules 2510 and 2520 along Y-axis.

Figure 25B:
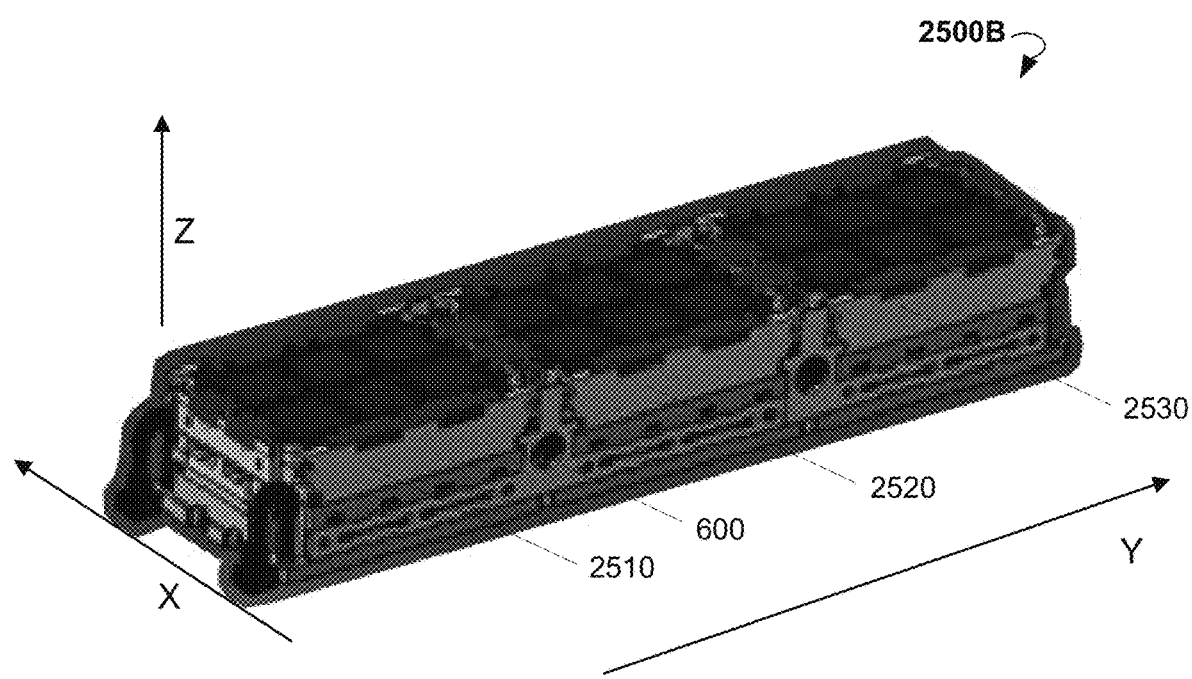
FIG. 25B is a top angle view of an example scalable battery module.

FIG. 25B is a top angle view of an example scalable battery module 2500B. The scalable battery module 2500B can include three submodules 2510, 2520, and 2530 connected along Y-axis by using one or more Y-connectors 600. One of the Y-connectors 600 can be disposed on the front size of the scalable battery module 2500B to secure positions of front sizes of the submodules 2510, 2520, and 2530 along Y-axis. Another Y-connector 600 can be disposed on the rear side of the scalable battery module 2500B to secure positions of the rear sides of the submodules 2510, 2520, and 2530 along Y-axis.

Figure 26A:
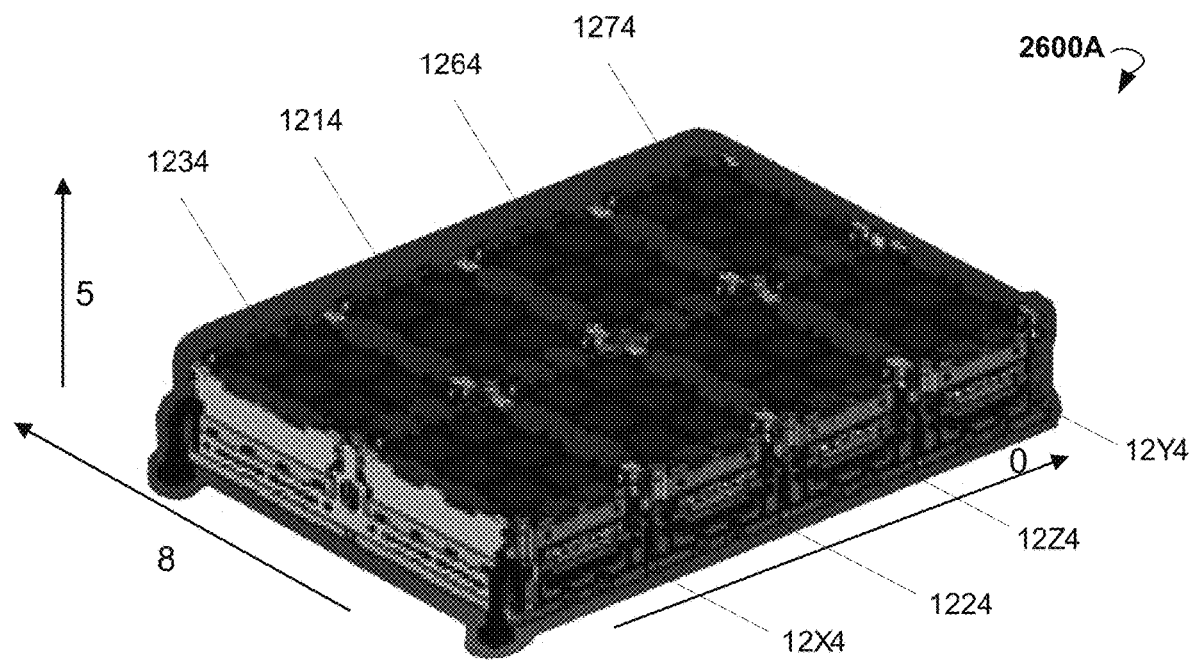
FIG. 26A is a top angle view of a scalable battery module, according to an example embodiment.

FIG. 26A is a top angle view of an example scalable battery module 2600A. The scalable battery module 2500A can include eight submodules 2610, 2520, 2630, 2640, 2650, 2660, 2670, and 2680 staggered in two rows along X-axis with four submodules in each row. From the front side of the module 2600A, the submodules 2650, 2560, 2670, and 2680 can be connected using X-connector 400 or X-connector 1500A. Similarly, from the rear side of the module 2600A, the 2610, 2520, 2630, and 2640 can be connected along X-axis using X-connector 400 or X-connector 1500A. A "double side" X-connector 300 or X-connector 1600A can be disposed in the middle between the row including submodules 2610, 2520, 2630, and 2640 and the row including 2650, 2560, 2670, and 2680 and attached to the submodules to further secure alignment of the modules along X-axis. From left side of the module 2600A, the submodules 2610 and 2650 can be secured using a Y-connector 600. Similarly, from the left side of the module 2600A, the submodules 2640 and 2680 can be secured by another Y-connector 600.

Figure 26B:
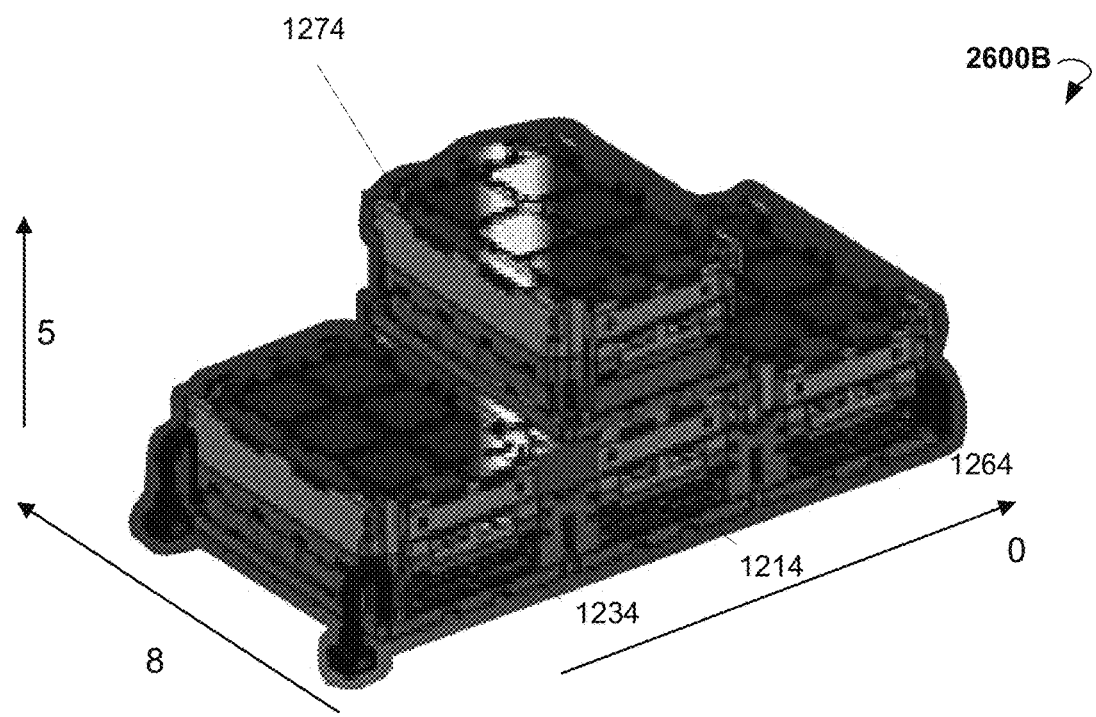
FIG. 26B is a top angle view of a scalable battery module, according to an example embodiment.

FIG. 26B is a top angle view of an example scalable battery module 2600B. The scalable battery module 2500B can include four submodules 2610, 2620, 2630, and 2640. The submodules 2610, 2520, and 2630 can be secured from the front side and the rear side of the module 2600B by X-connectors 400 or X-connectors 1500A. The submodules 2620 and 2640 can be secured by Z-connector 700 along Z-axis.

Figure 27:
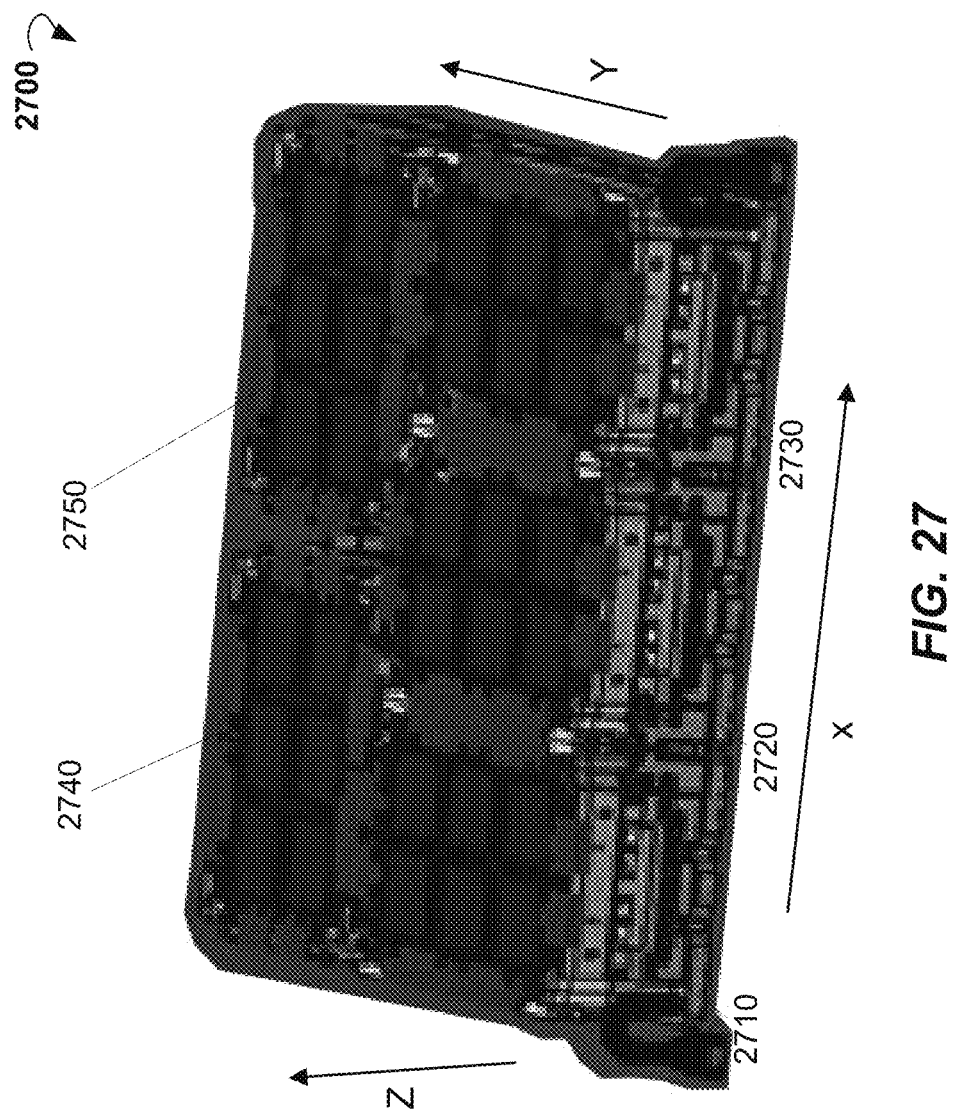
FIG. 27 is a top angle view of a scalable battery module, according to an example embodiment.

FIG. 27 is a top angle view of an example scalable battery module 2700. The scalable battery module 2700 can include five submodules 2710, 2720, 2730, 2740, and 2750. The submodules 2610, 2520, and 2630 can be secured from the front side by X-connectors 400 or X-connectors 1500A. The submodules 2740 and 2750 can be rotated by 90 degrees counterclockwise around Z-axis. Longer sides of the submodules 2740 and 2750 are aligned to shorter sides of the submodules 2610, 2520, and 2630. A "double side" X can be positioned between the submodules and attached to the submodules to secure alignment of all the submodules along X-axis. Form the rear side of the module 2700, the submodules 2740 and 2750 can be secured by a Y-connector 600. From the right side of the module 2700, the submodules 2730 and 2750 can be secured by a Y-connector 600. Similarly, from the left side of the module 2700, the submodules 2710 and 2740 can be secured by a Y-connector 600.

Figure 28:
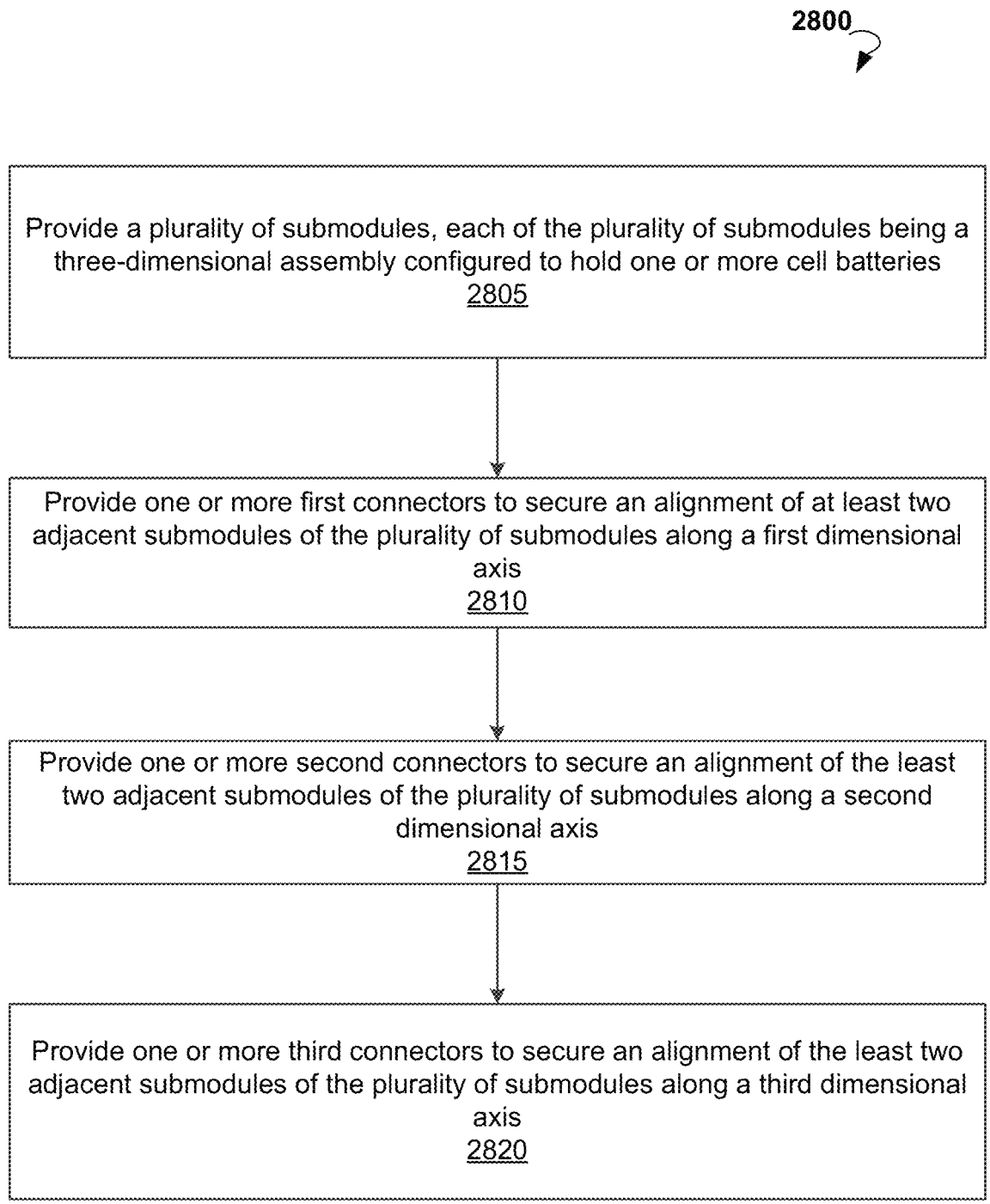
FIG. 28 is flow chart showing steps of an example method for providing a scalable battery module, according to an example embodiment

FIG. 28 is flow chart showing steps of an example method 2800 for providing a scalable battery module, according to an example embodiment. The method 800 may commence in block 2805 with providing a plurality of submodules. Each of the plurality of submodules can represent a three-dimensional assembly configured to hold one or more cell batteries. In block 2810, the method 2800 may provide one or more first connectors to secure an alignment at least two adjacent submodules of the plurality of submodules along a first dimensional axis.

In block 2815, the method 2800 may provide one or more second connectors to secure an alignment of least two adjacent submodules of the plurality of submodules along a second dimensional axis. In block 2820, the method 2800 may provide one or more third connectors to secure an alignment of the least two adjacent submodules of the plurality of submodules along a third dimensional axis.

Figure 29:
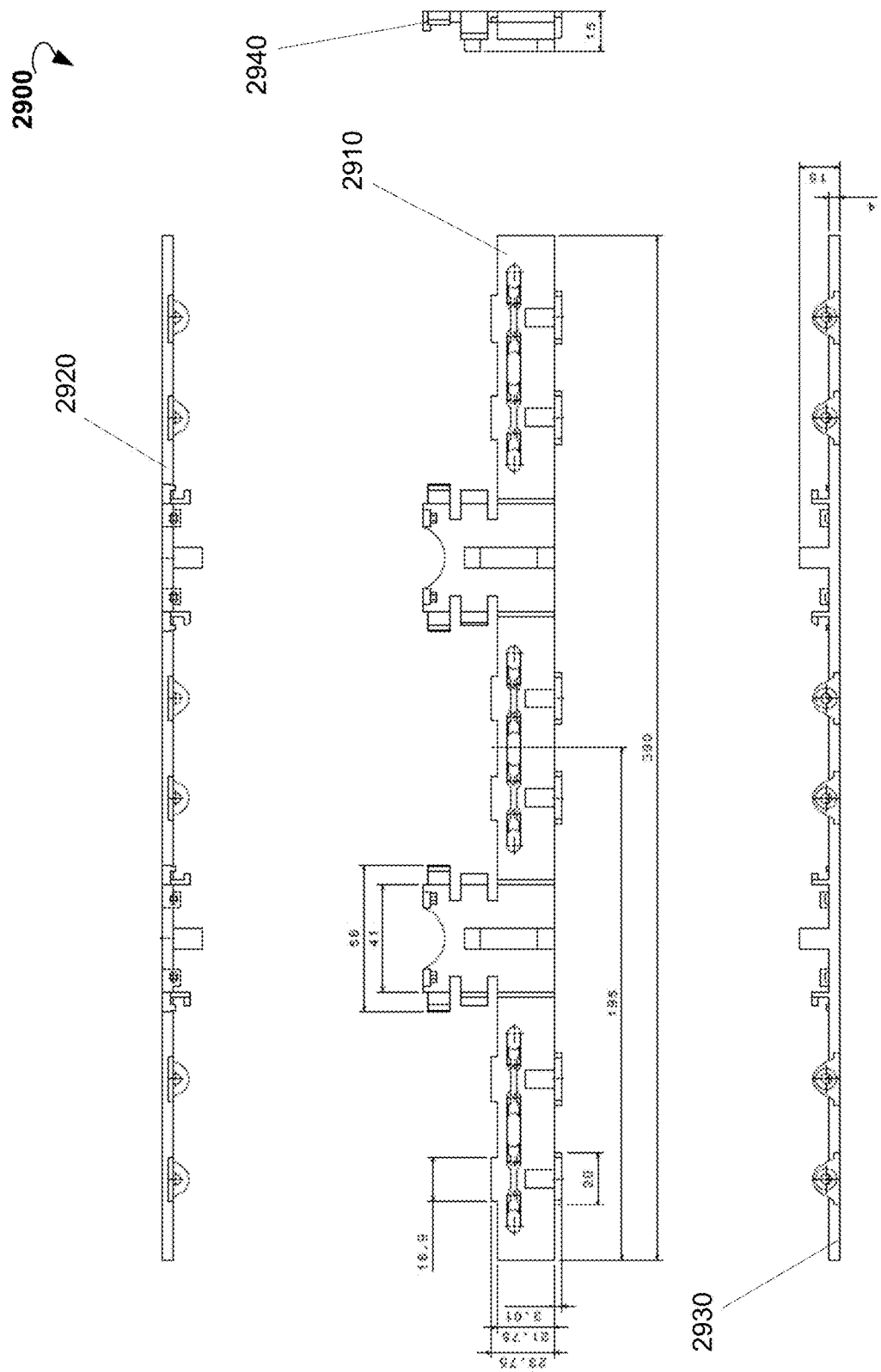
FIG. 29 is a technical drawing of a "single side" X-connector.

FIG. 29 is a technical drawing 2900 of the "single side" X-connector 400. The drawing 2910 is a front view of the X-connector 400. The drawing 2910 is a top view of the X-connector 400. The drawing 2920 is a bottom view of the X-connector 400. The drawing 2940 is a right-side view of the X-connector 400.

Figure 30:
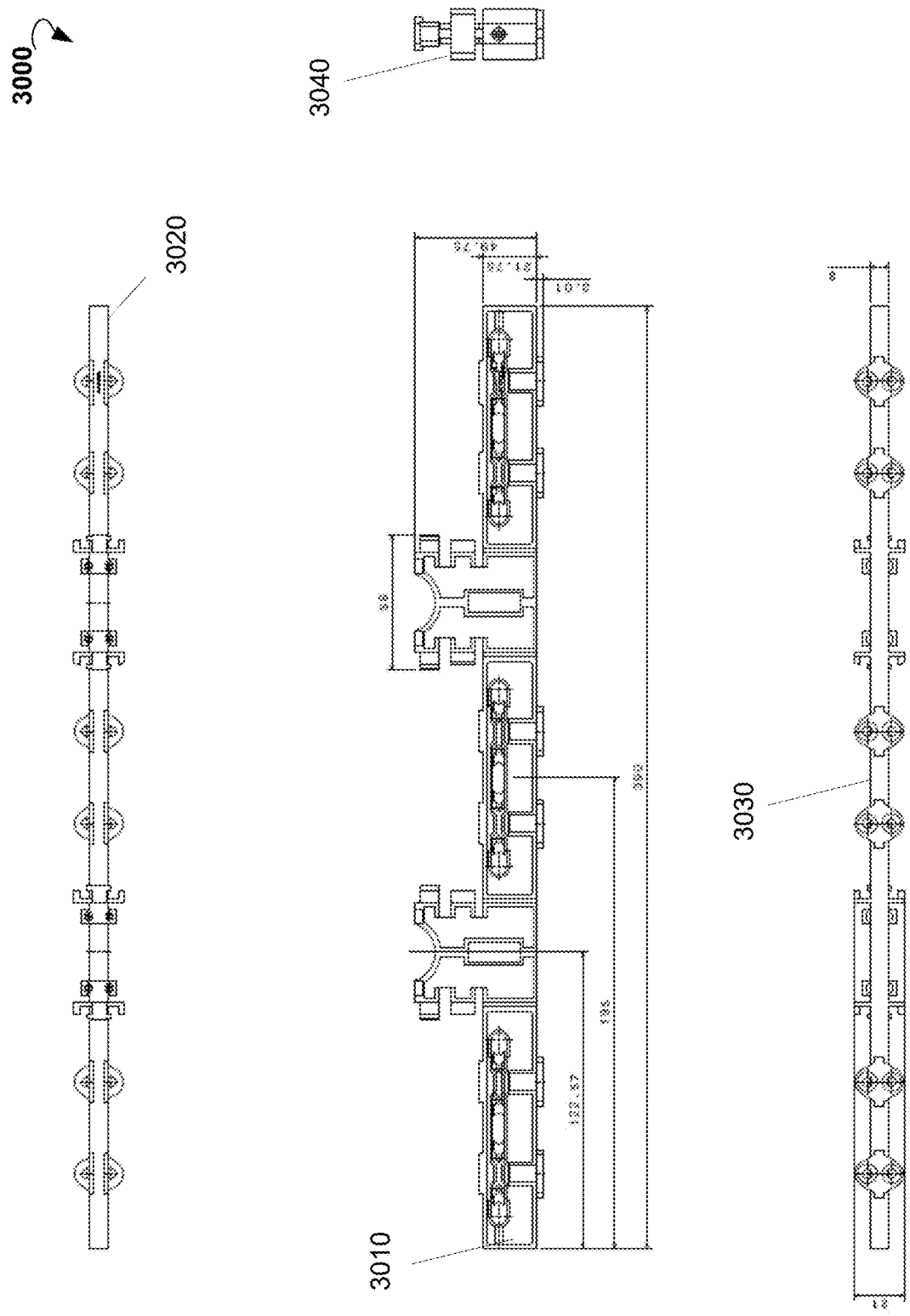
FIG. 30 is a technical drawing 3000 of a "double side" X-connector.

FIG. 30 is a technical drawing 3000 of the "double side" X-connector 300. The drawing 3010 is a front view of the X-connector 300. The drawing 3020 is a top view of the X-connector 300. The drawing 3030 is a bottom view of the X-connector 300. The drawing 3040 is a right-side view of the X-connector 300.

Figure 31:
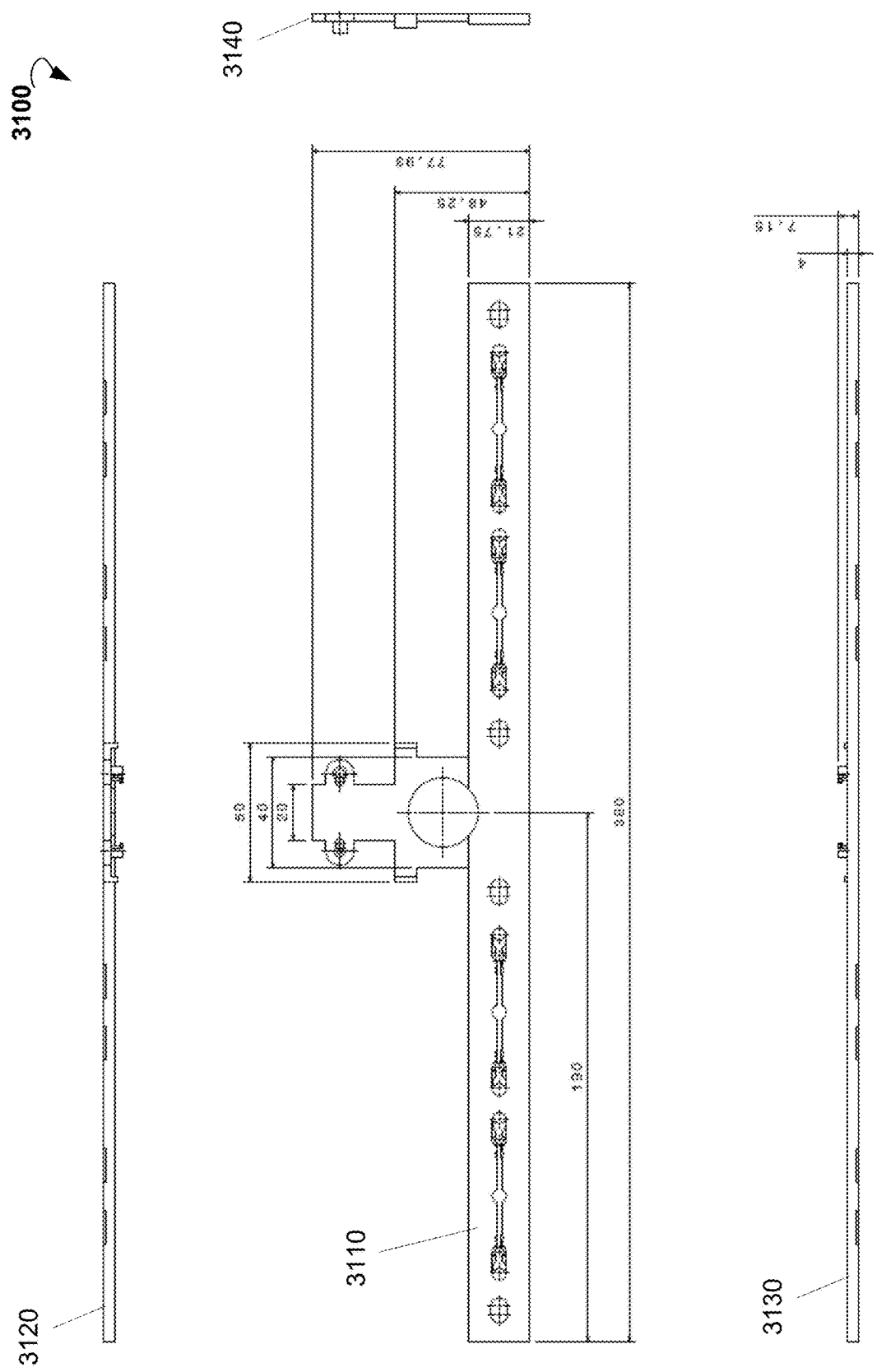
FIG. 31 is a technical drawing 3100 of a "single side" Y-connector.

FIG. 31 is a technical drawing 3100 of the "single side" Y-connector 600. The drawing 3110 is a front view of the Y-connector 600. The drawing 3110 is a top view of the X-connector 600. The drawing 3120 is a bottom view of the X-connector 600. The drawing 3140 is a right-side view of the Y-connector 600.

Figure 32:
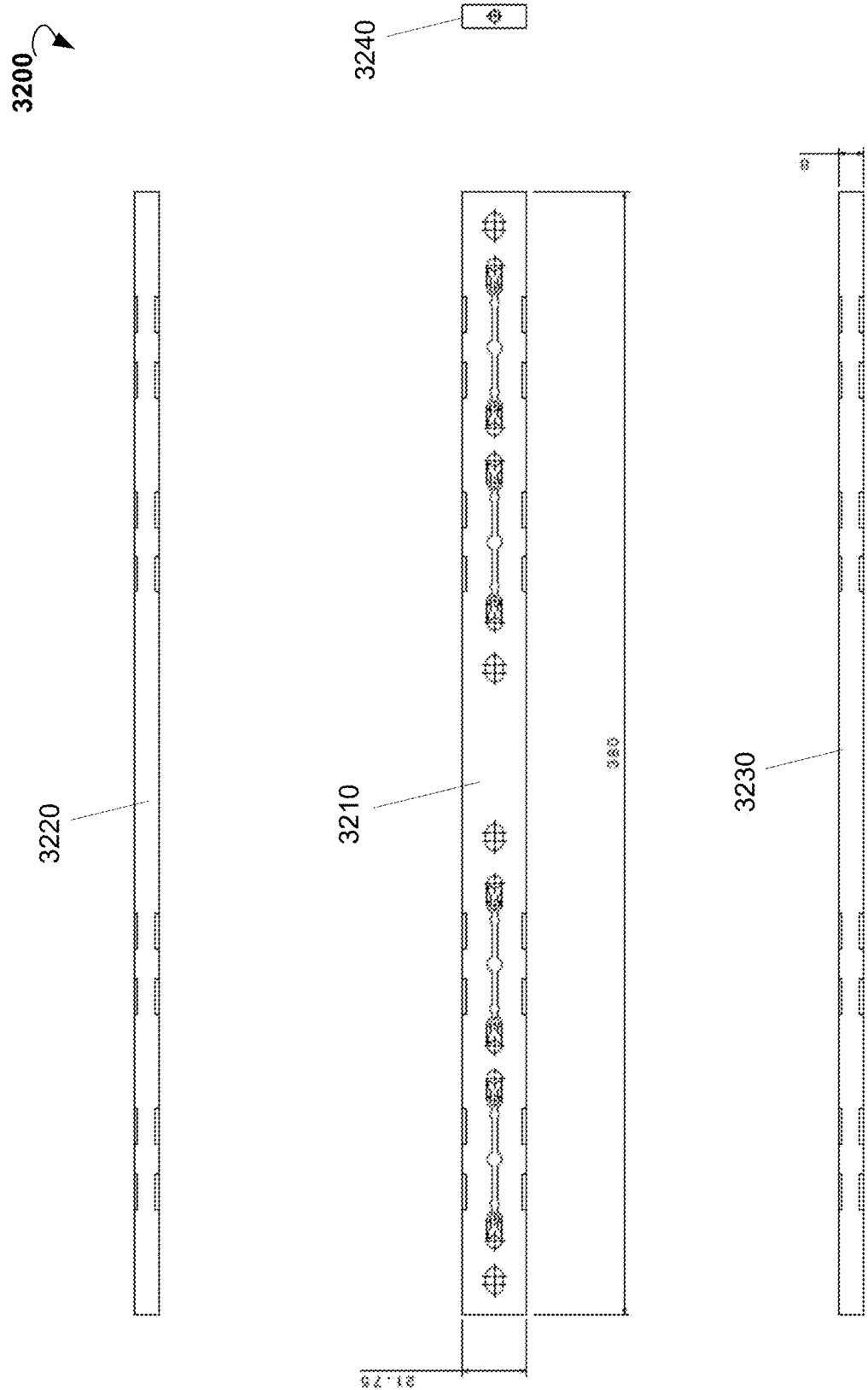
FIG. 32 is a technical drawing 3200 of a "double side" Y-connector 500.

FIG. 32 is a technical drawing 3200 of the "double side" Y-connector 500. The drawing 3210 is a front view of the Y-connector 500. The drawing 3220 is a top view of the Y-connector 500. The drawing 3230 is a bottom view of the Y-connector 500. The drawing 3240 is a right-side view of the Y-connector 500.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A scalable battery module comprising:
a plurality of submodules, each of the plurality of submodules being configured to hold one or more cell batteries;
a first connector configured to secure an alignment of a first submodule and a second submodule of the plurality of submodules along a first direction, wherein the first submodule and the second submodule are adjacent and are secured by using at least one of two first slots and at least two first projections disposed on the first connector; and the first connector comprises a first plate aligned, along the first direction, to the first submodule and the second submodule,
the first plate comprising:
a first projection along a second direction, wherein the first projection is disposed in a first pocket of the first submodule on a first side surface of the first submodule parallel to the first plate; and
a second projection along the second direction, wherein the second projection is disposed in a second pocket of the second submodule on a second side surface of the second submodule parallel to the first plate;
a second connector configured to secure an alignment of a third submodule and a fourth submodule of the plurality of submodules along the second direction perpendicular to the first direction, wherein the third submodule and the fourth submodule are adjacent and are secured by using at least two second slots disposed on the second connector; and
a third connector configured to secure an alignment of a fifth submodule and a sixth submodule of the plurality of submodules along a third direction perpendicular to the first direction and perpendicular to the second direction, wherein the fifth submodule and the sixth submodule are adjacent and are secured by using at least two second projections disposed on the third connector.

2. The scalable battery module of claim 1, wherein at least one of:
the first submodule is different from the second submodule in size in at least one of the first direction, the second direction, or the third direction;
the third submodule is different from the fourth submodule in size in at least one of the first direction, the second direction, or the third direction; or
the fifth submodule is different from the sixth submodule in size in at least one of the first direction, the second direction, or the third direction.

3. The scalable battery module of claim 1, wherein the fifth submodule is disposed on top of the sixth submodule.

4. The scalable battery module of claim 1, wherein at least one of:
the first submodule has a first edge having a length equal to a length of a second edge of the second submodule, and the first edge of the first submodule is adjacent to the second edge of the second submodule;
the third submodule has a third edge having a length equal to a length of a fourth edge of the fourth submodule, and the third edge of the third submodule is adjacent to the fourth edge of the fourth submodule; or
the fifth submodule has a fifth edge having a length equal to a length of a sixth edge of the sixth submodule, and the fifth edge of the fifth submodule is adjacent to the sixth edge of the sixth submodule.

5. The scalable battery module of claim 1, wherein at least one of:
the first submodule has a seventh edge longer than an eighth edge of the second submodule, and the seventh edge of the first submodule is adjacent to the eighth edge of the second submodule;
the third submodule has a ninth edge longer than a tenth edge of the fourth submodule, and the ninth edge of the third submodule is adjacent to the tenth edge of the fourth submodule; or
the fifth submodule has an eleventh edge longer than a twelfth edge of the sixth submodule, and the eleventh edge of the fifth submodule is adjacent to the twelfth edge of the sixth submodule.

6. The scalable battery module of claim 1, wherein the first connector comprises a second plate aligned, along the first direction, to the first submodule and the second submodule, the second plate comprising:
a third projection along the second direction, wherein the third projection is disposed in a third pocket of the first submodule on a third side surface of the first submodule orthogonal to the second plate; and a fourth projection along the second direction, wherein the fourth projection is disposed in a fourth pocket of the second submodule on a fourth side surface of the second submodule orthogonal to the second plate.

7. The scalable battery module of claim 1, wherein the first connector comprises a third plate aligned, along the first direction, to the first submodule and the second submodule, the third plate comprising:
a fifth projection along the second direction, wherein the fifth projection has a first aperture along the third direction, and the first aperture is configured to accept a first plugin located at a first bottom side surface of the first submodule; and
a sixth projection along the second direction, wherein the sixth projection has a second aperture along the third direction, and the second aperture is configured to accept a second plugin located at a second bottom side surface of the second submodule.

8. The scalable battery module of claim 1, wherein the first connector comprises a fourth plate aligned, along the first direction, to the first submodule and the second submodule, the fourth plate comprising:
one or more first tabs configured to insert into one or more third slots on a fifth side surface of the first submodule;
one or more second tabs configured to insert into one or more fourth slots on a sixth side surface of the second submodule;
one or more fifth slots configured to accept one or more third tabs on the fifth side surface of the first submodule; and
one or more sixth slots configured to accept one or more fourth tabs on the sixth side surface of the second submodule.

9. The scalable battery module of claim 1, wherein the second connector comprises a fifth plate aligned, along the second direction, to the third submodule and the fourth submodule, the fifth plate comprising:
one or more fifth tabs configured to insert into one or more seventh slots on a seventh side surface of the first submodule;
one or more sixth tabs configured to insert into one or more eighth slots on an eighth side surface of the second submodule;
one or more ninth slots configured to accept one or more seventh tabs on the seventh side surface of the first submodule; and
one or more tenth slots configured to accept one or more eighth tabs on the eighth side surface of the second submodule.

10. The scalable battery module of claim 1, wherein the third connector comprises a sixth plate configured to be positioned between a third bottom surface of the fifth submodule and a first top surface of the sixth submodule, the sixth plate comprising:
a seventh projection along the third direction, wherein the seventh projection is configured to be inserted into an eleventh slot located at the third bottom surface of the fifth submodule;
an eighth projection along the third direction, wherein the eighth projection is configured to be inserted in a twelfth slot located at the third bottom surface of the fifth submodule;
a ninth projection along the third direction and opposite to the seventh projection, wherein the ninth projection is configured to be inserted into a thirteenth slot located at the first top surface of the sixth submodule; and
a tenth projection along the third direction and opposite to the eighth projection, wherein the tenth projection is configured to be inserted into a fourteenth slot located at the first top surface of the sixth submodule.

11. The scalable battery module of claim 1, further comprising a three-dimensional assembly, wherein the three-dimensional assembly comprises:
a cooling chamber assembly configured to receive the one or more cell batteries;
an electric connection assembly configured to be in electric contact with the one or more cell batteries, wherein the one or more cell batteries are disposed between the cooling chamber assembly and the electric connection assembly; and
a cover assembly for covering the electric connection assembly.

12. The scalable battery module of claim 11, wherein the cover assembly comprises:
a cover;
a thermal coupler assembly molded into the cover;
one or more busbar covers to cover one or more busbars attached to at least one of the plurality of submodules; and
a battery management unit (BMU) attached to the cover.

13. The scalable battery module of claim 12, wherein the first connector comprises a seventh plate configured to be aligned, along the first direction, to the first submodule and the second submodule, the seventh plate comprising:
a fifth pocket along the third direction, wherein the fifth pocket is configured to accept a first plugin of a first BMU of the first submodule; and
a sixth pocket along the third direction, wherein the sixth pocket is configured to accept a second plugin of a second BMU of the second submodule.

14. The scalable battery module of claim 11, wherein the electric connection assembly comprises:
a plastic body;
positive current collectors molded into the plastic body, wherein the positive current collectors are configured to be in contact with anodes of the one or more cell batteries;
negative current collectors molded into the plastic body, wherein the negative current collectors are configured to be in contact with cathodes of the one or more cell batteries; and
a plastic insulation layer molded into the plastic body and located between the positive current collectors and the negative current collectors.

15. The scalable battery module of claim 14, further comprising a first elastic layer coupled to the positive current collectors and a second elastic layer coupled to the negative current collectors.

16. The scalable battery module of claim 11, wherein the cooling chamber assembly comprises:
a plastic assembly for supporting the one or more cell batteries;
a metal separator disposed within the plastic assembly, the metal separator comprising nozzles for water; and
an injection bottom cover welded at a bottom of the plastic assembly to seal the water.

17. The scalable battery module of claim 16, wherein the plastic assembly comprises:
a plastic housing;
first thermal plastic parts disposed in the plastic housing, wherein the first thermal plastic parts are configured to be in direct contact with a hotter portion of the one or more cell batteries;

water inlets and water outlets disposed within the plastic housing; and second thermal plastic parts disposed at a bottom of the plastic housing and configured to contact bottom surfaces of the one or more cell batteries.

18. The scalable battery module of claim 17, wherein the first thermal plastic parts and the second thermal plastic parts are made of a material having a thermal conductivity of at least 10 Watts per megakelvin.

19. The scalable battery module of claim 1, wherein the first connector comprises an eighth plate having a first plate side and a second plate side, opposite to the first plate side, the eighth plate is aligned, along the first direction, by the first plate side, to a seventh first submodule and an eighth submodule of the plurality of submodules and, by the second plate side, to a ninth submodule and a tenth submodule of the plurality of submodules, the eighth plate comprising:

an eleventh projection on the first plate side and along the second direction, wherein the eleventh projection is disposed in a seventh pocket of the seventh submodule on a ninth side surface of the seventh submodule parallel to the eighth plate;

a twelfth projection on the first plate side and along the second direction, wherein the twelfth projection is disposed in an eighth pocket of the eighth submodule on a tenth side surface of the eighth submodule parallel to the eighth plate;

a thirteenth projection on the second plate side and along the second direction, wherein the thirteenth projection is disposed in a ninth pocket of the ninth submodule on an eleventh side surface of the ninth submodule parallel to the eighth plate; and a fourteenth projection on the second plate side and along the second direction, wherein the fourteenth projection is disposed in a tenth pocket of the tenth submodule on a twelfth side surface of the tenth submodule parallel to the eighth plate.

20. The scalable battery module of claim 1, wherein the one or more cell batteries provide power to one or more electrical motors of an electrically-driven car, wherein the one or more electrical motors causes the electrically-driven car to move.

* * * * *